(12) United States Patent
Elaasar

(10) Patent No.: US 8,689,173 B2
(45) Date of Patent: Apr. 1, 2014

(54) DETECTING DESIGN PATTERNS IN MODELS BY UTILIZING TRANSFORMATION LANGUAGE

(75) Inventor: Maged Elaasar, Kanata (CA)

(73) Assignee: International Business Machines Corporation, Armonk, NY (US)

(*) Notice: Subject to any disclaimer, the term of this patent is extended or adjusted under 35 U.S.C. 154(b) by 509 days.

(21) Appl. No.: 13/011,448

(22) Filed: Jan. 21, 2011

(65) Prior Publication Data

US 2012/0192143 A1 Jul. 26, 2012

(51) Int. Cl.
*G06F 9/44* (2006.01)
*G06F 9/45* (2006.01)

(52) U.S. Cl.
USPC ............ 717/104; 717/105; 717/136; 717/144

(58) Field of Classification Search
None
See application file for complete search history.

(56) References Cited

U.S. PATENT DOCUMENTS

| | | | |
|---|---|---|---|
| 7,627,861 B2 * | 12/2009 | Smith et al. .................. | 717/144 |
| 7,660,818 B2 | 2/2010 | Lulu | |
| 7,774,745 B2 * | 8/2010 | Fildebrandt et al. .......... | 717/105 |
| 7,784,038 B2 * | 8/2010 | Charlebois et al. ........... | 717/144 |
| 2004/0153992 A1 * | 8/2004 | Molina-Moreno et al. ... | 717/105 |
| 2005/0039173 A1 * | 2/2005 | Tondreau et al. ............. | 717/136 |
| 2006/0048112 A1 * | 3/2006 | Thiagarajan et al. ......... | 717/104 |
| 2006/0225032 A1 * | 10/2006 | Klerk et al. ................... | 717/105 |
| 2007/0006179 A1 * | 1/2007 | Tjong et al. ................... | 717/136 |
| 2007/0033570 A1 * | 2/2007 | Kong ............................. | 717/104 |
| 2007/0101261 A1 | 5/2007 | Kelly et al. | |
| 2007/0168929 A1 * | 7/2007 | Larvet et al. .................. | 717/104 |
| 2007/0266366 A1 * | 11/2007 | Bucuvalas ..................... | 717/104 |
| 2008/0104579 A1 * | 5/2008 | Hartmann ...................... | 717/136 |
| 2008/0134135 A1 * | 6/2008 | Elaasar .......................... | 717/104 |
| 2008/0301626 A1 | 12/2008 | Sivaram | |
| 2009/0265684 A1 * | 10/2009 | Fuchs et al. ................... | 717/105 |
| 2010/0131916 A1 * | 5/2010 | Prigge ........................... | 717/104 |

OTHER PUBLICATIONS

Ivan Kurtev, State of the Art of QVT: A Model Transformation Language Standard, 2008, pp. 378-392.*
Marion Murzek, Detection of Structural Transformation Patterns in Business Process Models, 2002, pp. 2-10.*
Audris Kalnins, Model Transformation Language MOLA, 2005, pp. 62-74.*
Laurence Tratt, A change propagating model transformation language, 2008, pp. 108-120.*
Bayley, et al., "Formal Specification of the Variants and Behavioral Features of Design Patterns", J. of System and Software vol. 83, issue 2, pp. 209-222, 2010.
Beyer, et al., "Efficient relational calculation for software analysis", IEEE TSE 31 (2), 137-149, 2005.

(Continued)

*Primary Examiner* — Thuy Dao
*Assistant Examiner* — Mongbao Nguyen
(74) *Attorney, Agent, or Firm* — Cantor Colburn LLP

(57) ABSTRACT

A mechanism is provided for detecting pattern occurrences utilizing a transformation software application on a computer. An input model is received in which the transformation software application is configured to detect model elements playing pattern roles, and report them in an output model (conforming to new pattern result language). A pattern specification is configured as a declarative transformation relation that is used by the transformation software application to detect pattern occurrences in the input model. Pattern occurrences are reported in the output model, where the pattern occurrences are instances of the pattern detected in the input model.

16 Claims, 22 Drawing Sheets

(56) References Cited

OTHER PUBLICATIONS

Birkner, "Objected-Oriented Design Pattern Detection Using Static and Dynamic Analysis in Jave Software", Master Thesis, Univ. of Applied Sciences Bonn-Rhein-Sieg. Germany, Aug. 2007.
Dong, et al., "Design Pattern Evolutions in QVT", Computer Science Department, University of Texas as Dallas, Richardson, TX 75083, USA; American Airlines, Fort Worth, TX 76155, USA; 2010.
Dong, et al., "DP-Miner: Design Pattern Discovery Using Matrix." Proc. 14th Ann. IEEE Int'l Conf. Eng. Computer-Based Systems (ECBS '07), pp. 371-380, Mar. 2007.
Dong, et al., "Visualizing Design Patterns in Their Applications and Compositions", IEEE Trans. Softw. Eng. 33, 7, pp. 433-453, Jul. 2007.
Eppstein, "Subgraph Isomorphism in Planar Graphs and Related Problems," Proc. Sixth Ann. Symp. Discrete Algorithms, pp. 632-640, Jan. 1995.
Gueheneuc, et al., "DeMIMA: A Multilayered Approach for Design Pattern Identification", IEEE Tran. Software Engineering, vol. 34, Issue 5, pp. 667-684, 2008.
Gueheneuc, et al., "Fingerprinting Design Pattern" Proceeding of the 11th Working Conference on Reverse Engineering (WCRE), 2004.
Huang, et al., "A Practical Pattern Recovery Approach Based on Both Structural and Behavioral Analysis", J. System Software 75 (1-2), 69-87, 2005.
Kim, et al., "Role-Based Metamodeling Language (RBML)", Computer Science and Engineering Department; Oakland University; copyright 2004; pp. 1-42.
Kim, et al., "Evaluating Pattern Conformance of UML Models: A Divide-and-Conquer Approach and Case Studies", Software Quality Journal 16(3). 329-359, 2008.
Mak, et al., "Precise Modeling of Design Patterns in UML", Proc. ICSE pp. 252-261. 2004.
Maplesden, et al. "Design Pattern Modeling and Instantiation Using DPML", TOOLS Pacific, pp. 3-11, 2002.
Seemann, et al., "Pattern-Based Design Recovery of Jave Software", Proc. of the 6th Int'l symposium on Foundations of software engineering. pp. 10-16, 1998.
Taibi, et al., "Formal Specification of Design Patterns—a Balanced Approach", Journal of Obj. Tech. 2 (4), 2003.
Tamura, et al., "A Comparison of Taxonomies for Model Transformation Languages", Author manuscript, published in "Paradigma 4, 1 (2010)", version 1-2 Jun. 2010; pp. 1-14.
Whaler, "Formalizing Relational Model Transformation Approaches", Information Security Group, Dept. of Computer Science; Swiss Federal Institute of Technology Zurich (ETHZ); pp. 1-12; Mar. 2007.
Tsantalis, et al., "Design Pattern Detection Using Similarity Scoring", IEEE Transaction on Software Engineering, vol. 32, No. 11, Nov. 2006, pp. 896-909.

\* cited by examiner

FIG. 2A: Transformation UMLToRDMS

```
transformation UMLToRBBMS (uml : UML, rdbms : RDBMS) {...
    relation PackageToSchema {...}
    relation ClassToTable {...}
    relation AttributeToColumn {...}
...}
```

FIG. 2B: The Relation PackageToSchema

```
relation PackageToSchema { /* maps each package to a schema */
    domain uml p:Package { name=pn };
    domain rdbms s:Schema { name=pn };
}
```

FIG. 3: The Relation ClassToTable

```
relation ClassToTable { /* maps each concrete class to a table */
    domain uml c:Class {
        name= cn,
        isAbstract= false,
        package = p:Package{}
    };
    domain rdbms t:Table {
        name= cn,
        schema = s:Schema{}
    };
    when { PackageToSchema(p, s); }
    where { AttributeToColumn(c, t); }
}
```

FIG. 4: The Transformation UMLToRDBMS with Top and Non-Top Relations

```
transformation uml2rdbms (uml : UML, rdbms : RDBMS) {...
    top relation PackageToSchema {...}
    top relation ClassToTable {...}
    relation AttributeToColumn {...}
...}
```

FIG. 5: The Relation PackageToSchema with CheckOnly and Enforce Domains

```
relation PackageToSchema { /* maps each package to a schema */
    checkonly domain uml p:Package { name=pn }
    enforce domain rdbms s:Schema { name=pn }
}
```

FIG. 7: The Unique Keys of RDBMS

```
key RDBMS::Schema { name };
key RDBMS::Table { name, schema };
```

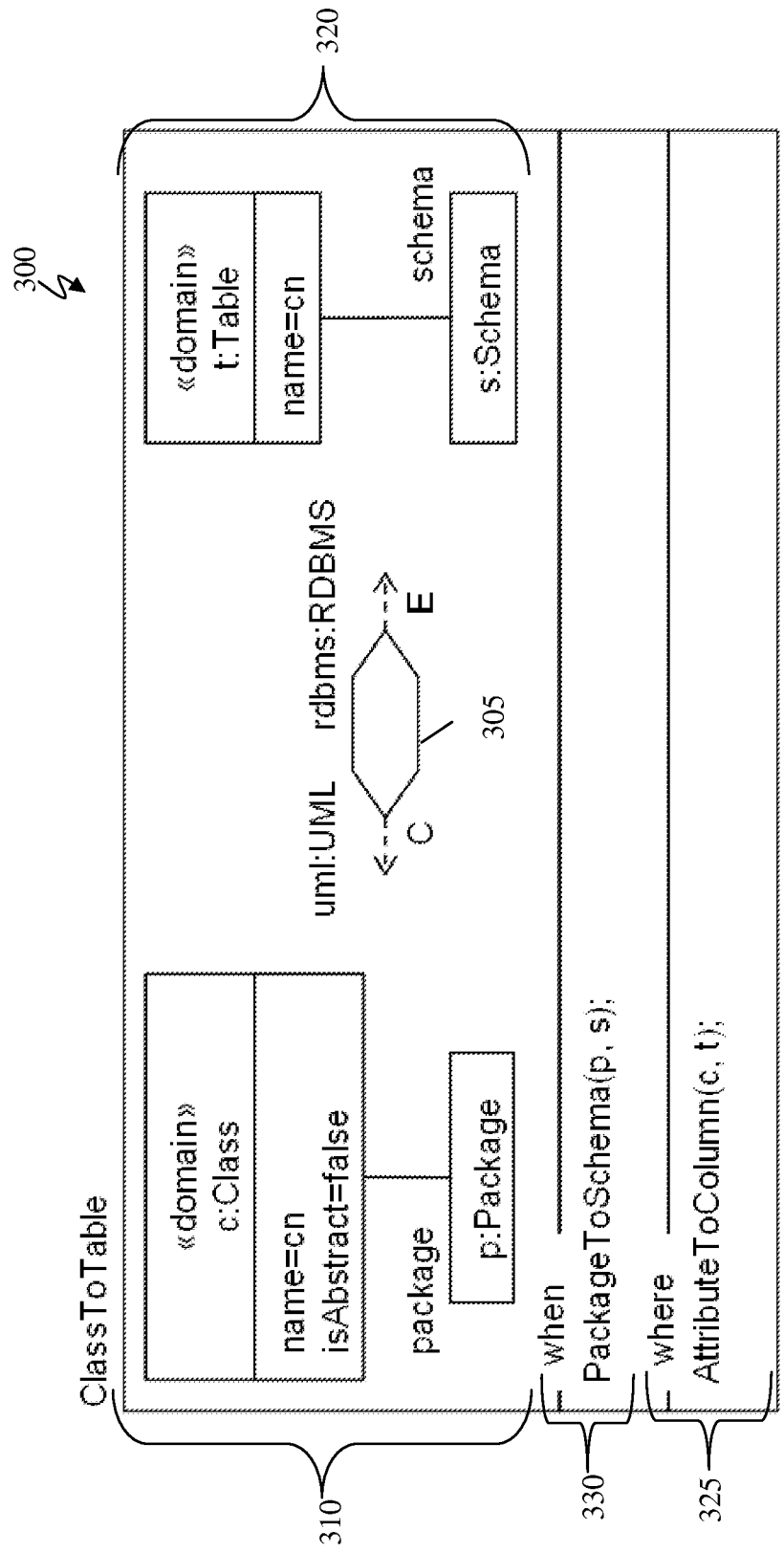
FIG. 6: The Relation ClassToTable in Graphical Notation

FIG. 8: The Relation ClassToTable using a Query As a Condition

```
relation ClassToTable { /* maps concrete classes with singular attributes only
*/
    domain uml c:Class {...};
    domain rdbms t:Table {...};
    when {
        areAllAttributesSingular(c);
        PackageToSchema(p, s);
    }
    where { AttributeToColumn(c, t); }
}
query areAllAttributesSingular (c : Class) : Boolean {
    c.ownedAttribute->forAll(a|a.lower <= 1)
}
```

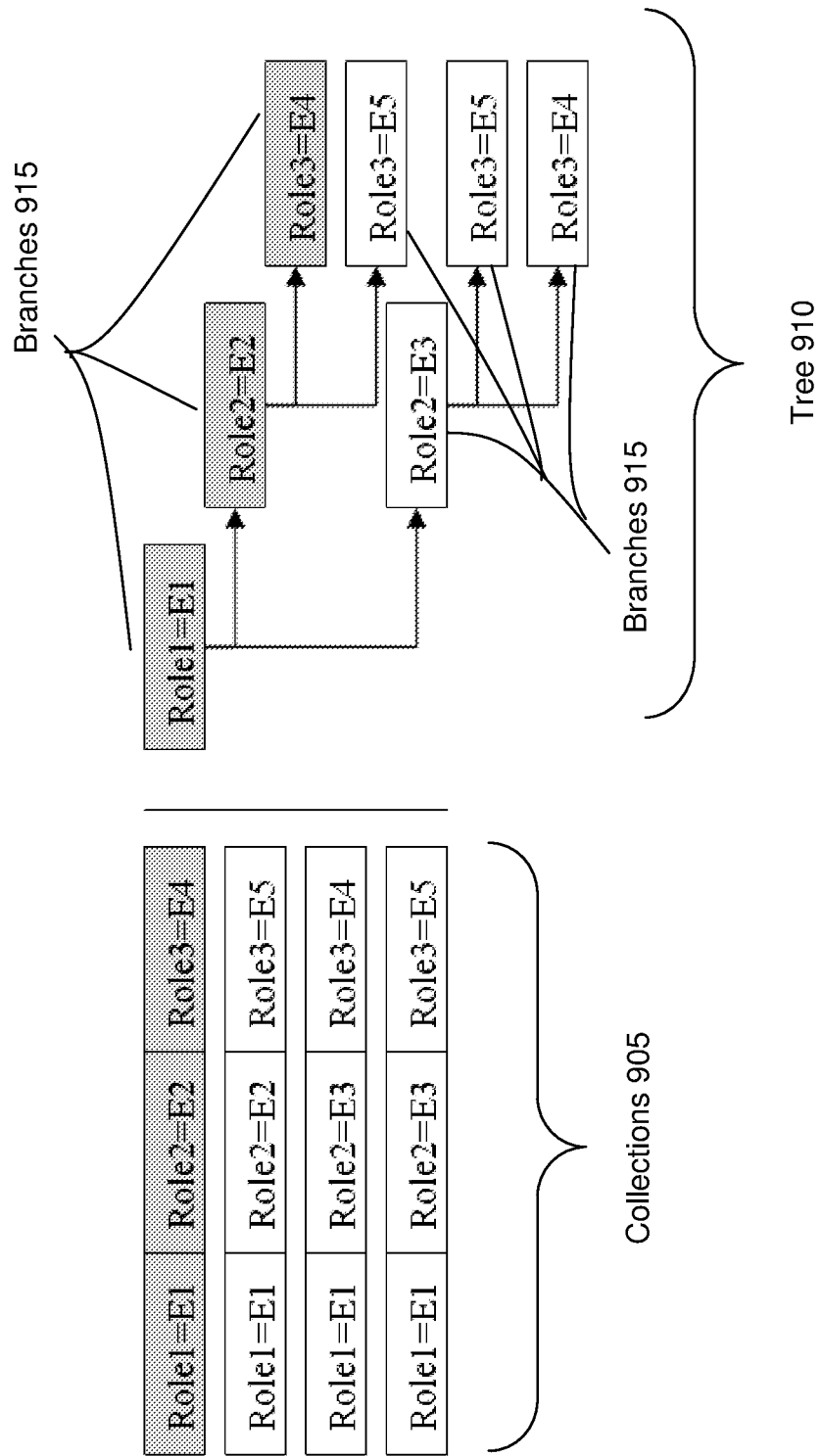
FIG. 9: Pattern Occurrences as Collections (Left) or as a Tree (right)

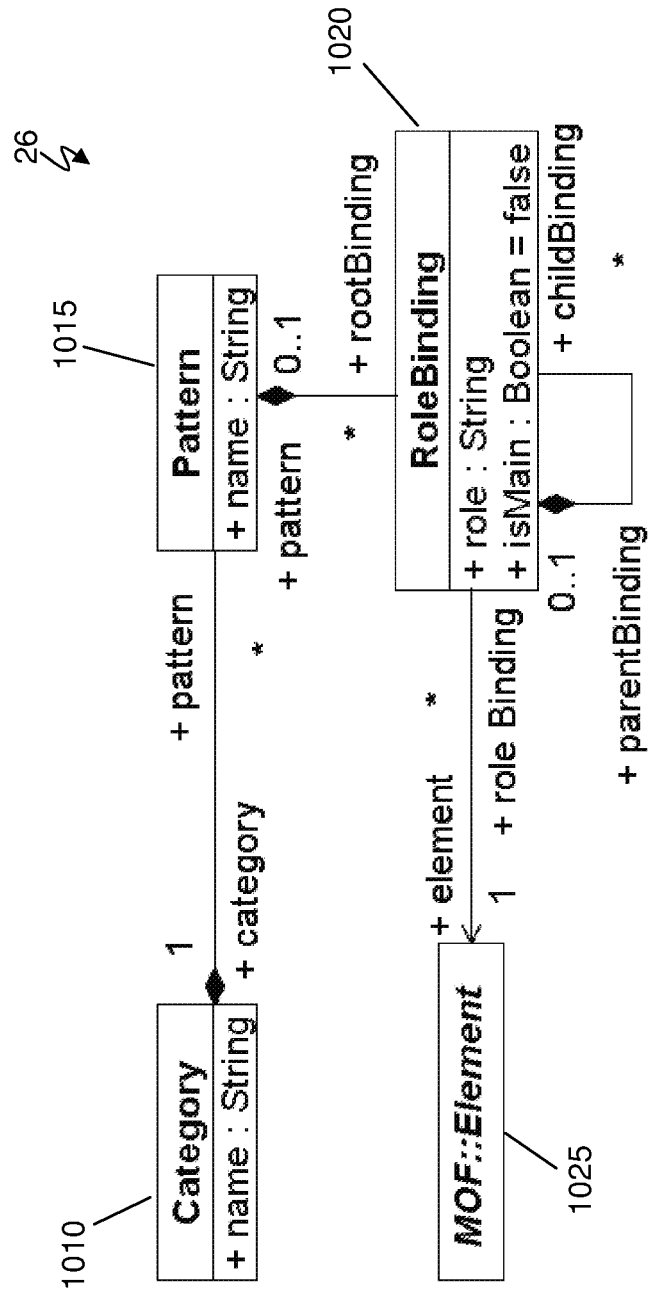
FIG. 10: pResults Class Diagram

Two Variants of Adapter Pattern: Class Adapter (left) and Object Adapter (right)

FIG. 12: GoF Transformation with Relation AdapterPattern

```
transformation GoF (uml : UML, presults : pResults) {
  top relation AdapterPattern {
    checkonly domain uml Target:Class {};
    checkonly domain uml Adapter:Class {};
    checkonly domain uml Adaptee:Class {};
    checkonly domain uml request:Operation {};
    checkonly domain uml realRequest:Operation {};
    enforce domain presults c:Category {name='Structural',
      pattern = p:Pattern {name='Adapter',
        rootBinding = rb1:RoleBinding {role='Target', element=Target:Class{}},
        childBinding = rb2:RoleBinding {role='Adapter', element=Adapter:Class{}},
        childBinding = rb3:RoleBinding {role='Adaptee', element=Adaptee:Class{}},
        childBinding = rb4:RoleBinding {role='request', element=request:Operation{}},
        childBinding = rb5:RoleBinding {role='realRequest', element=realRequest:Operation{}}
      }}}}};
  }
}
```

Relation as Pattern Specification 30

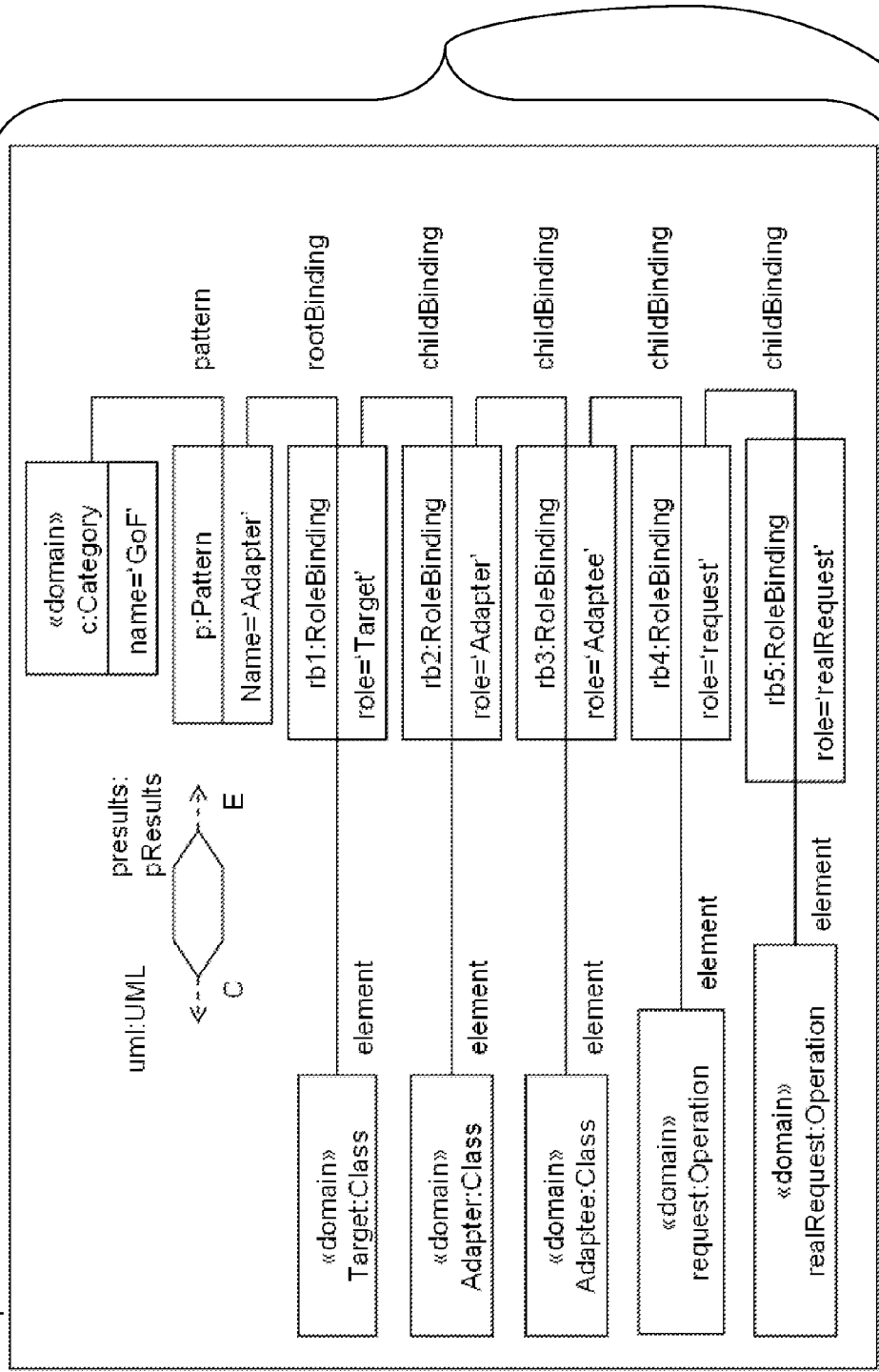
FIG. 13: Relation AdapterPattern in Graphical Notation

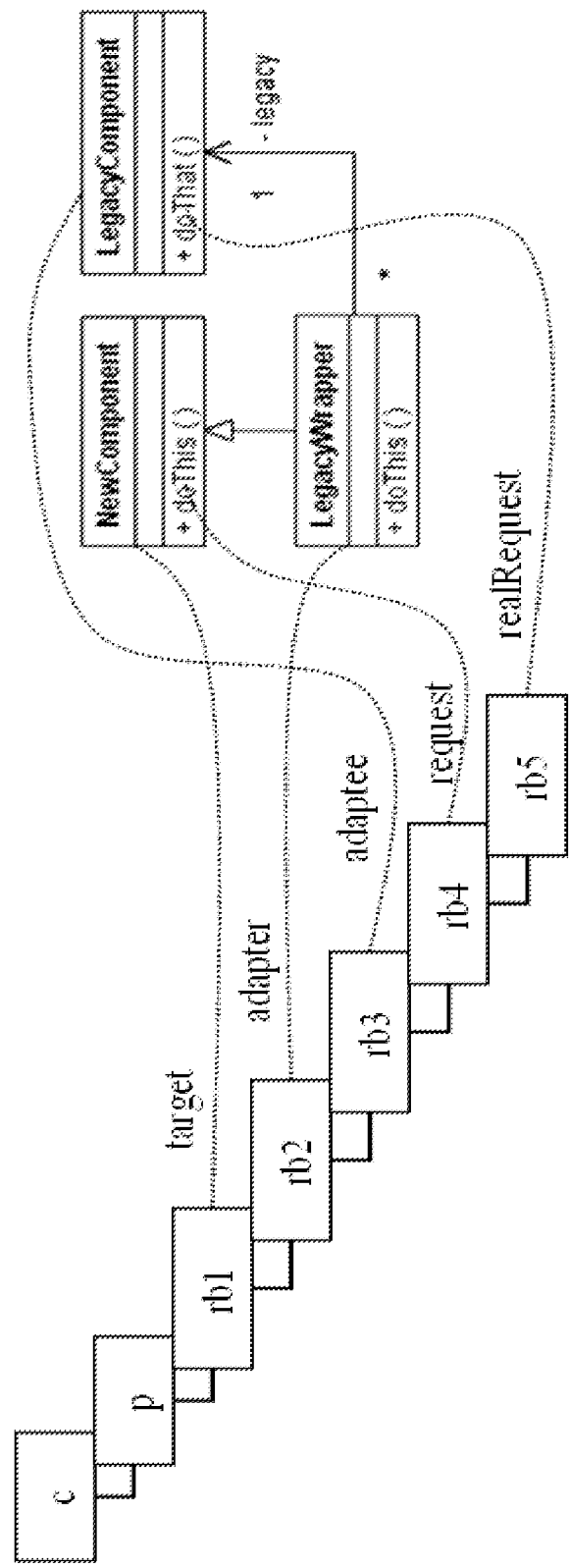
FIG. 14: A Unique Binding of AdapterPattern Objects to UML Elements

FIG. 15: The Unique Keys of pResults

```
key pResults::Category { name };
key pResults::Pattern { name, category };
key pResults::RoleBinding { role, element, pattern };
key pResults::RoleBinding { role, element, parentBinding };
```

FIG. 16A: The AdapterPattern Relation (top) extended by Two Variant Relations (bottom)

```
top relation AdapterPattern {
  checkonly domain uml Target:Class {
    isAbstract = true,
    ownedOperation = request:Operation {}
  };
  checkonly domain uml Adapter:Class {
    superClass = Target:Class {},
    ownedOperation = request2:Operation {
    isAbstract = false,
    redefinedOperation = request:Operation {}
  }
  };
  checkonly domain uml Adaptee:Class {
    ownedOperation = realRequest:Operation {}
  };
  checkonly domain uml request:Operation {
    isAbstract = true
  };
  checkonly domain uml realRequest:Operation {};
  where {
    ClassAdapterPattern(Target, Adapter, Adaptee, request, realRequest, request2, null);
    ObjectAdapterPattern(Target, Adapter, Adaptee, request, realRequest, request2, null);
  }
}
```

| FIG. 16A |
|---|
| FIG. 16B |

FIG. 16B: The AdapterPattern Relation (top) extended by Two Variant Relations (bottom)

```
relation ClassAdapterPattern {
  checkonly domain uml Target:Class {};
  checkonly domain uml Adapter:Class {
    superClass = Adaptee:Class {}
  };
  checkonly domain uml Adaptee:Class {};
  checkonly domain uml request:Operation {};
  checkonly domain uml realRequest:Operation{};
  checkonly domain uml request2:Operation {};
  enforce domain presults c:Category {...}
  when {
    directLocalCall(request2, realRequest);
  }
}
query directLocalCall(caller:Operation,
  callee:Operation):Boolean {...}
```
⎫
⎬ 1605
⎭

```
relation ObjectAdapterPattern {
  checkonly domain uml Target:Class {};
  checkonly domain uml Adapter:Class {
    ownedAttribute = anAdaptee:Property {
      lower = 1,
      upper = 1,
      type = Adaptee:Class {}
    }
  };
  checkonly domain uml Adaptee:Class {};
  checkonly domain uml request:Operation {};
  checkonly domain uml realRequest:Operation{};
  checkonly domain uml request2:Operation {};
  enforce domain presults c:Category {...}
  when {
    directDelegationCall(request2, anAdaptee,
      realRequest);
  }
}
query directDelegationCall(caller:Operation,
  link:TypedElement, callee:Operation):Boolean {...}
```
⎫
⎬ 1610
⎭

1600 Continued

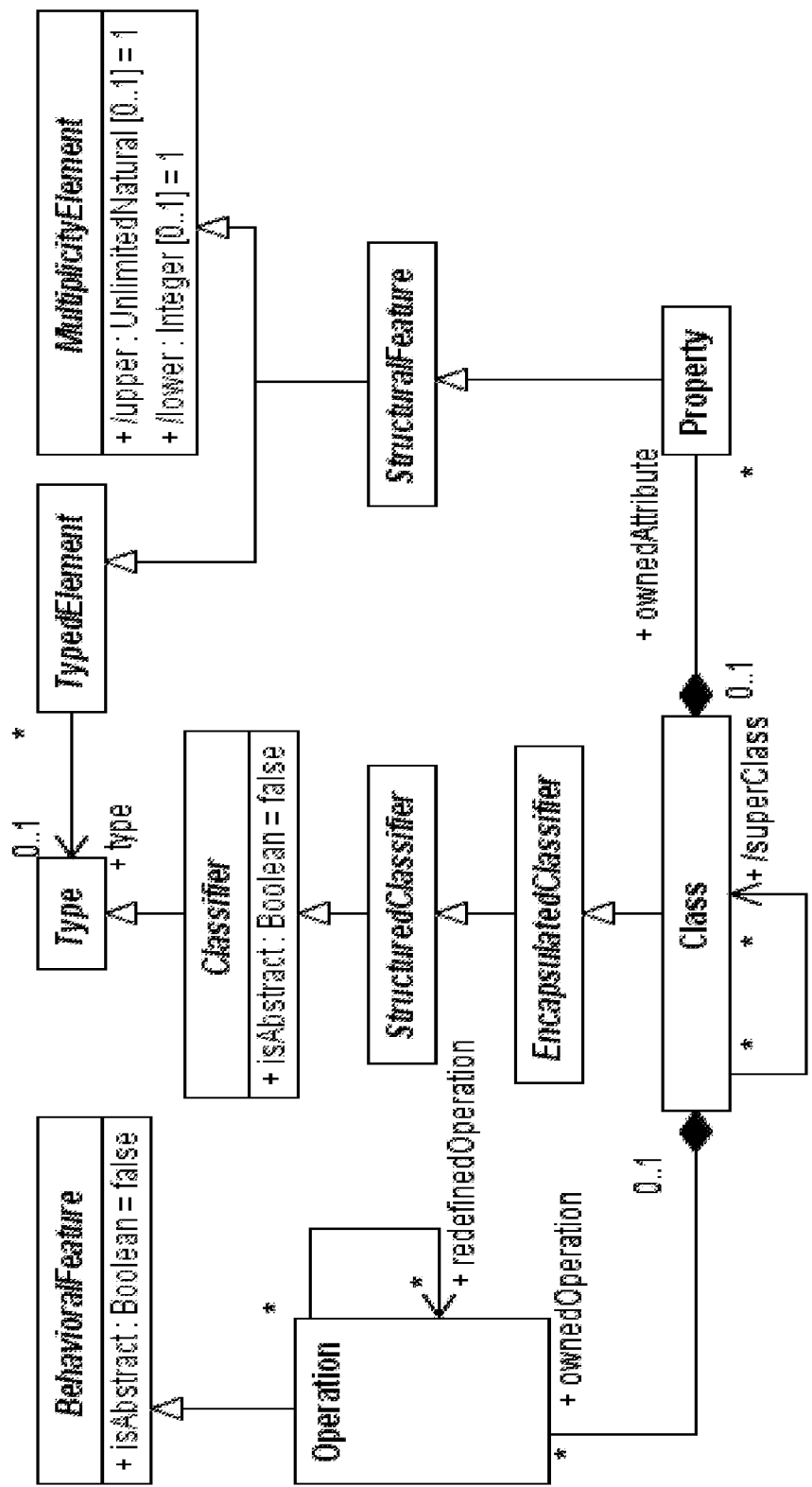
FIG. 17: A Subset of the UML 2.3 Metamodel

FIG. 18: The Definition of the directLocalCall and directDelegationCall Queries 1. query directLocalCall(caller:Operation, callee:Operation) : Boolean {
   (caller.postcondition->size() = 0 and caller.method->isEmpty()) or
   caller.postcondition->exists(c| directLocalCall(c, callee)) or
   directLocalCall(caller.method.oclAsType(Interaction), callee)
   }

2. query directDelegationCall(caller:Operation, link:TypedElement, callee:Operation) : Boolean {
   (caller.postcondition->size() = 0 and caller.method->isEmpty()) or
   caller.postcondition->exists(c| directDelegationCall(c, link, callee)) or
   directDelegationCall(caller.method.oclAsType(Interaction), link, callee)
   }

3. query directLocalCall(interaction:Interaction, callee:Operation) : Boolean {
   interaction.message->exists(m|
   m.messageSort = MessageSort::synchCall and m.signature = callee and
   m.sendEvent.oclIsKindOf(MessageOccurrenceSpecification) and
   m.sendEvent.oclAsType(MessageOccurrenceSpecification).covered->exists(l|l.name='self') and
   m.receiveEvent.oclIsKindOf (MessageOccurrenceSpecification) and
   m.receiveEvent.oclAsType (MessageOccurrenceSpecification).covered->exists(l|l.name='self'))
   }

4. query directDelegationCall(interaction:Interaction, link:TypedElement, callee:Operation):Boolean {
   interaction.message->exists(m|
   m.messageSort = MessageSort::synchCall and m.signature = callee and
   m.sendEvent.oclIsKindOf(MessageOccurrenceSpecification) and
   m.sendEvent.oclAsType(MessageOccurrenceSpecification).covered->exists(l|l.name='self') and
   m.receiveEvent.oclIsKindOf (MessageOccurrenceSpecification) and
   m.receiveEvent.oclAsType (MessageOccurrenceSpecification).covered->exists(l|l.represents=link))
   }

5. query directLocalCall(c:Constraint, callee:Operation):Boolean;/*black-box*/
6. query directDelegationCall(c:Constraint, link:TypedElement, callee:Operation):Boolean;/*black-box*/

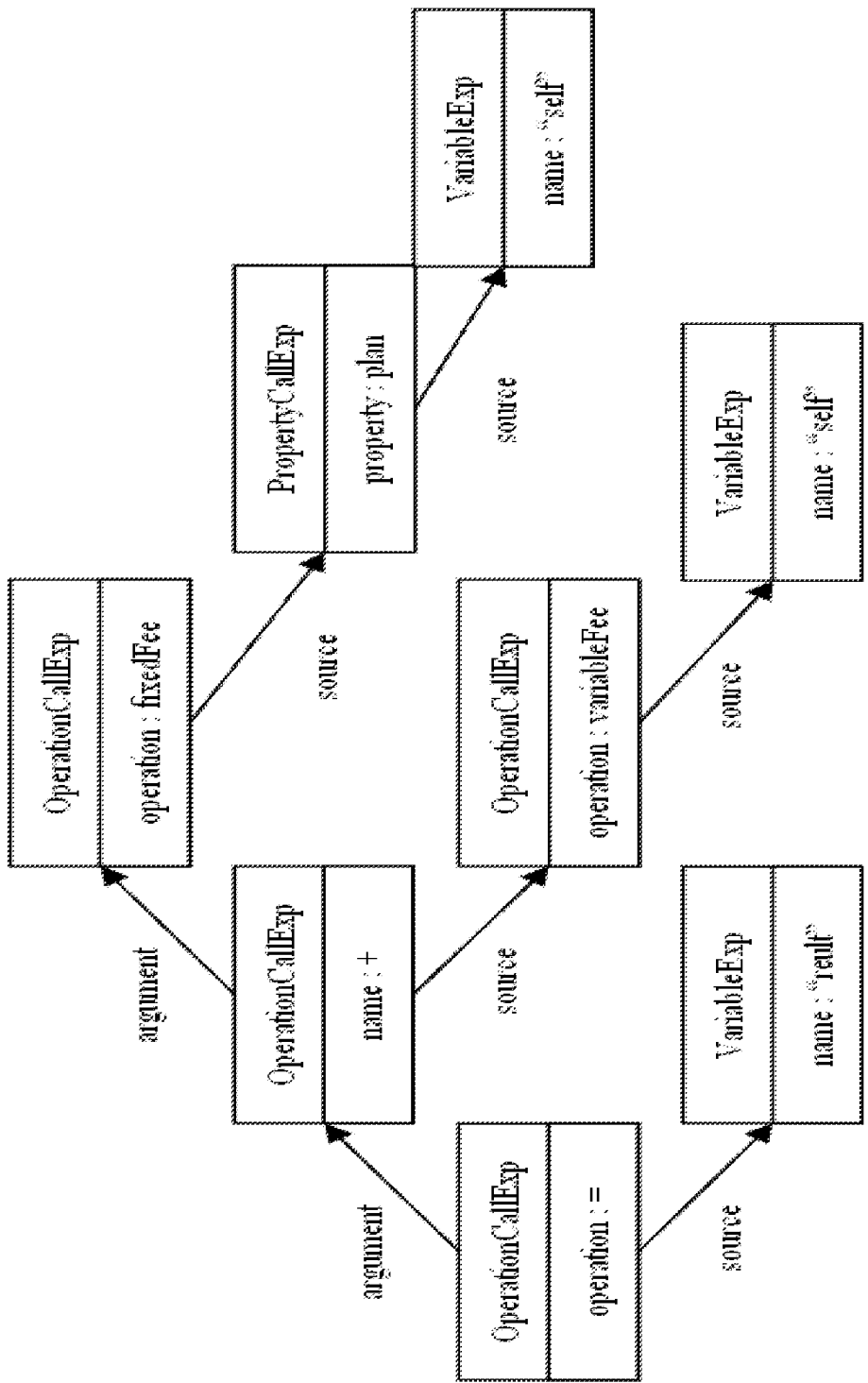
FIG. 19: The AST of the OCL Expression: result = variableFee() + plan.fixedFee()

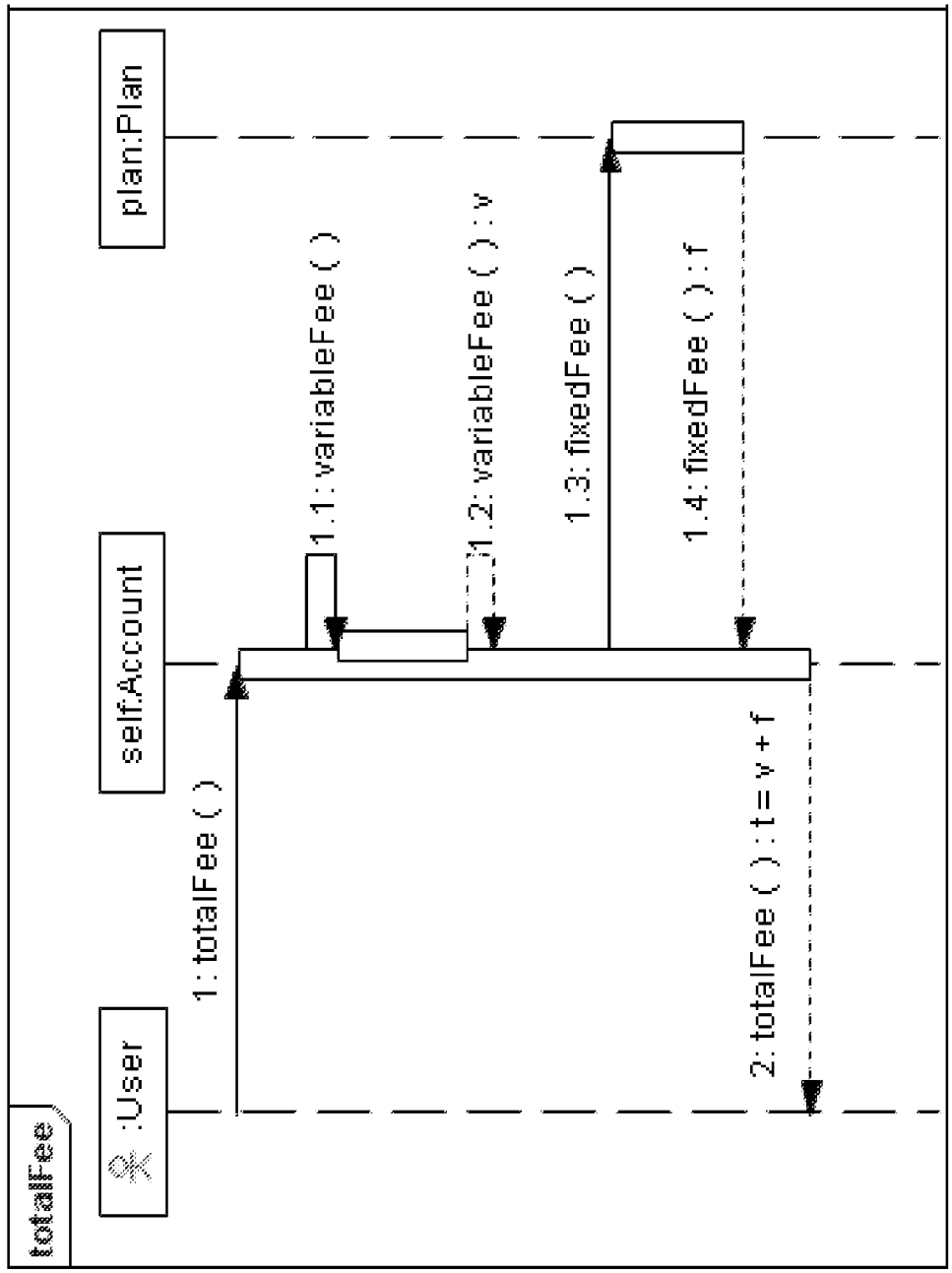
FIG. 20: A Sequence Diagram Representing the Behavior of Operation totalFee

FIG. 21: The Query allSuperClasses

```
relation AdapterPattern {...
  checkonly domain uml Target:Class {}
  checkonly domain uml Adapter:Class {}
  when {
    allSuperClasses(Adapter)->includes(Target);
  }
...}
query allSuperClasses (c : Class) : Set(Class) {
  c.superClass->union(c.superClass->collect(s|allSuperClasses(s)))
}
```

2100

FIG. 22: The Derived Property allSuperClasses

```
relation AdapterPattern {...
  checkonly domain uml Target:Class {}
  checkonly domain uml Adapter:Class {
    allSuperClasses = Target:Class {}
  }
...}
property Class::allSuperClasses : Set(Class) =
  self.superClass-
  >union(self.superClass.allSuperClasses);
```

FIG. 23: The Definition of the localCall and delegationCall Queries

| relation ClassAdapterPattern {... <br> when { <br>   localCall(request2, realRequest); <br> } <br> ...} | relation ObjectAdapterPattern {... <br> when { <br>   delegationCall(request2, anAdaptee, realRequest); <br> } <br> ...} |
|---|---| query localCall(caller:Operation, callee:Operation) : Boolean {
  localCall(caller, callee, Set{caller})
} query localCall(caller:Operation, callee:Operation, stack:Set(Operation)) : Boolean {
  directLocalCall(caller, callee) or
  caller.class.ownedOperation->exists(o| stack->excludes(o) and directLocalCall(caller, o) and
    localCall(o, callee, stack->union(Set{o})))
} query delegationCall(caller:Operation, link:TypedElement, callee:Operation) : Boolean {
  delegationCall(caller, link, callee, Set{caller})
} query delegationCall(caller:Operation,link:TypedElement,callee:Operation, stack:Set(Operation)):Boolean {
  directDelegationCall(caller, link, callee) or
  caller.class.ownedOperation->exists(o| stack->excludes(o) and directLocalCall(caller, o) and
    delegationCall(o, link, callee, stack->union(Set{o})))
}

FIG. 24: The pResults Domain with isMain flags

```
enforce domain presults c:Category {name='GoF',
  pattern = p:Pattern {name='Adapter',
    rootBinding = rb1:RoleBinding {role='Target', element=Target:Class{}, isMain=true,
      childBinding = rb2:RoleBinding {role='Adapter', element=Adapter:Class{},
        isMain=true,
          childBinding = rb3:RoleBinding {role='Adaptee', element=Adaptee:Class{},
        isMain=true,
          childBinding = rb4:RoleBinding {role='request', element=request:Operation{}
          childBinding = rb5:RoleBinding {role='realRequest',
            element=realRequest:Operation{}
}}}}}}
```

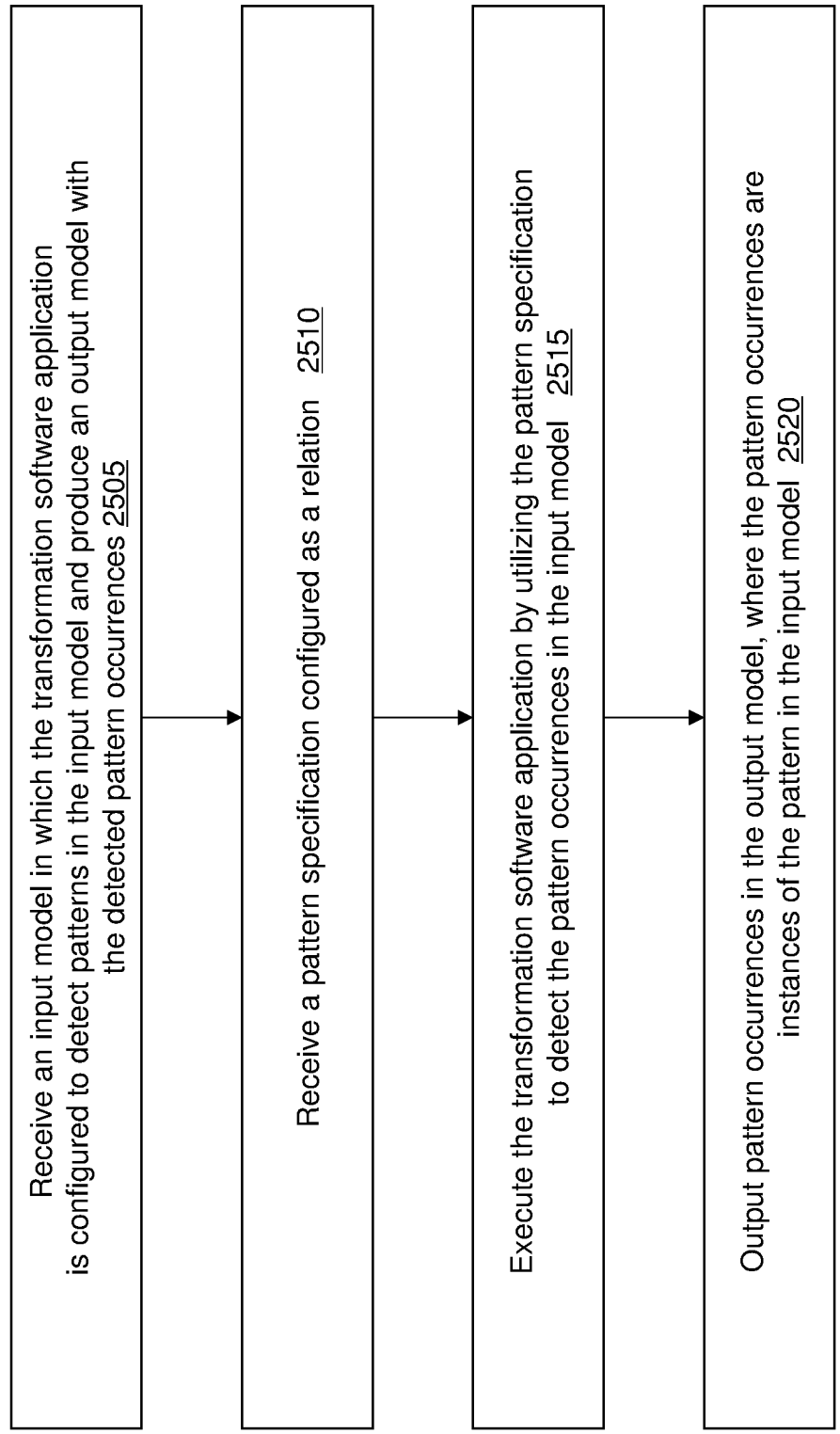

DETECTING DESIGN PATTERNS IN MODELS BY UTILIZING TRANSFORMATION LANGUAGE

BACKGROUND

Exemplary embodiments relate to model transformation, and more particularly to pattern specification and pattern detection utilizing model transformation language.

Model transformation in model-driven engineering takes as input a model conforming to a given metamodel and produces as output another model conforming to a given metamodel. If the source and target metamodels are identical, the transformation is called endogeneous. If they are different the transformation is called exogeneous. If the level of abstraction does not change, the transformation is called horizontal. If the level of abstraction does change, the transformation is called vertical.

A model transformation language in systems and software engineering is a language for model transformation. Presently, there are several products (commercial or open source) that comply to what is called the QVT standard. QVT defines a standard way to transform source models into target models. QVT (Query/View/Transformation), in the model-driven architecture, is a standard for model transformation defined by the Object Management Group (OMG).

BRIEF SUMMARY

According to exemplary embodiments, a processor is configured to execute computer instructions. Memory includes a transformation software application configured for transforming an input model in a modeling language to an output model by utilizing transformation logic of the transformation software application, and a pattern specification configured as a relation. The processor is configured to receive an input of the pattern specification. The processor is configured to execute the transformation software application by utilizing the pattern specification to detect the pattern specification in the source input model. The processor is configured to output pattern occurrences in the output model, where the pattern occurrences are instances of detecting the pattern specification in the source input model.

Additional features are realized through the techniques of the present disclosure. Other systems, methods, apparatus, and/or computer program products according to other embodiments are described in detail herein and are considered a part of the claimed invention. For a better understanding of exemplary embodiments and features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The foregoing and other features of the present disclosure are apparent from the following detailed description taken in conjunction with the accompanying drawings in which:

FIG. 2A illustrates an example of transformation.

FIG. 2B illustrates an example of a relation.

FIG. 3 illustrates an example of a relation.

FIG. 4 illustrates an example of a transformation with top and non-top relations.

FIG. 5 illustrates an example of a relation.

FIG. 6 illustrates an example of a relation in graphical notation.

FIG. 7 illustrates an example of keys.

FIG. 8 illustrates an example of a relation as a condition.

FIG. 9 illustrates an example of pattern occurrences in accordance with exemplary embodiments.

FIG. 10 illustrates an example of pResults in accordance with exemplary embodiments.

FIG. 12 illustrates an example relation in accordance with exemplary embodiments.

FIG. 13 illustrates an example relation in graphical notation in accordance with exemplary embodiments.

FIG. 14 illustrates an example of binding relation objects to UML elements in accordance with exemplary embodiments.

FIG. 15 illustrates an example of keys of pResults in accordance with exemplary embodiments.

FIGS. 16A and 16B illustrate an example relation in accordance with exemplary embodiments.

FIG. 17 illustrates an example subset of a metamodel in accordance with exemplary embodiments.

FIG. 18 illustrates example queries in accordance with exemplary embodiments.

FIG. 19 illustrates an example expression in accordance with exemplary embodiments.

FIG. 20 illustrates an example diagram in accordance with exemplary embodiments.

FIG. 21 illustrates an example relation in accordance with exemplary embodiments.

FIG. 22 illustrates an example relation in accordance with exemplary embodiments.

FIG. 23 illustrates an example relation in accordance with exemplary embodiments.

FIG. 24 illustrates an example of the pResults domain in accordance with exemplary embodiments.

FIG. 25 illustrates a flow chart in accordance with exemplary embodiments.

DETAILED DESCRIPTION

Figure 1:
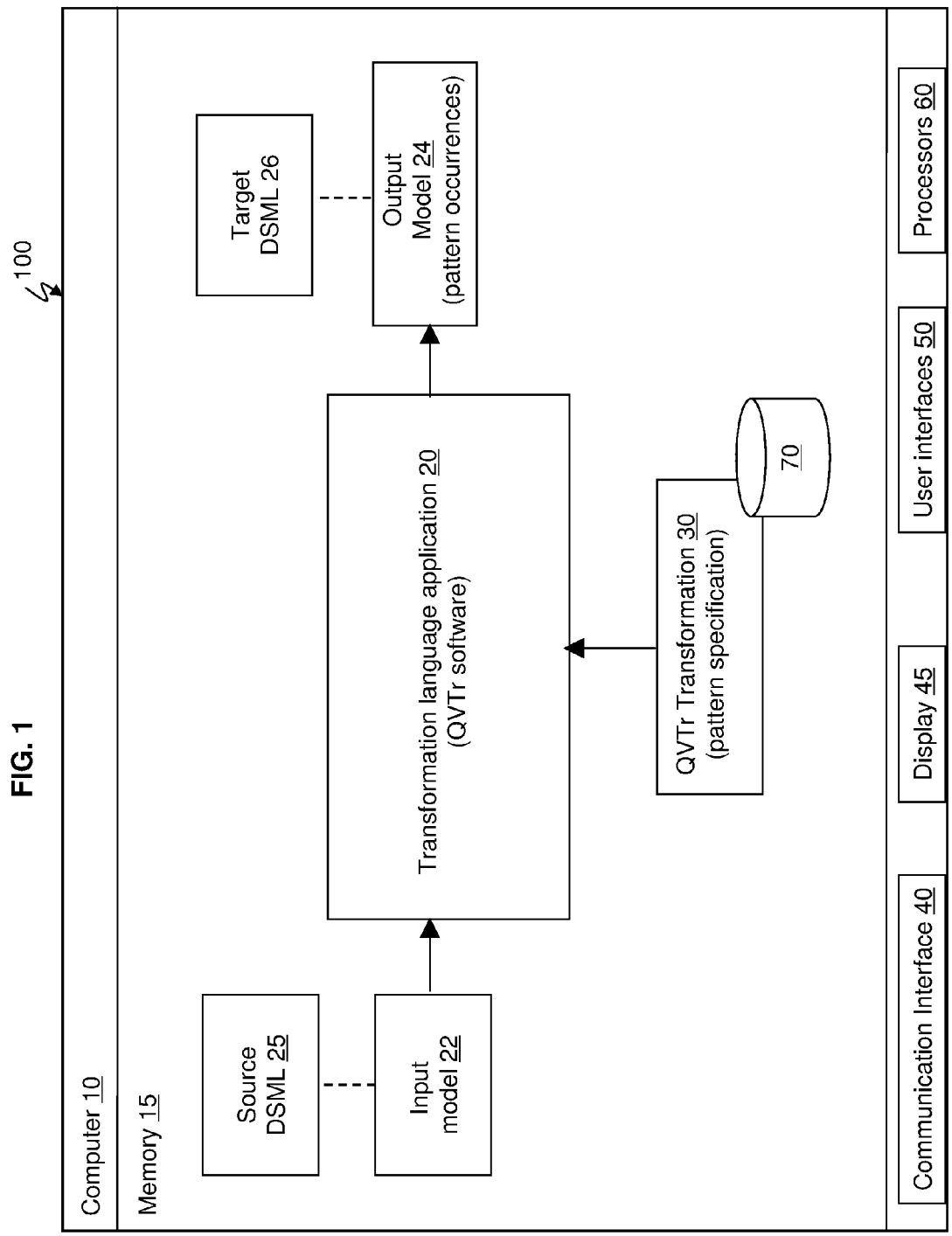
FIG. 1 illustrates a block diagram of computer in accordance with exemplary embodiments.

A design pattern (also called a pattern or software pattern) is a recurring and well-understood design fragment. In the context of a domain-specific modeling language (DSML), a design pattern is represented as a structure of constrained and inter-related model elements. Techniques that analyze models by detecting occurrences of known design patterns can simplify model comprehension and maintenance. Though each DSML may have its own unique set of design patterns, it may not be practical to learn a separate detection technology for each specific DSML or family of design patterns.

In this disclosure, exemplary embodiments describe a generic approach to specify domain-specific design patterns for Meta Object family (MOF)-based DSMLs at the metamodel level and automatically detect their occurrences in models. The approach may utilize QVT (Query/View/Transformation). In accordance with exemplary embodiments, patterns are specified declaratively with QVT-Relations (QVTr) transformations from DSML models (where elements playing pattern roles are identified) to a newly-defined DSML model for reporting identified pattern occurrences. Pattern detection is implemented by executing these transformations according to exemplary embodiments. The approach has been prototyped using Eclipse technologies and used in a case study to detect, e.g., the well-known GoF patterns in a design model of a large open-source system. Results were then analyzed for accuracy using precision and recall as metrics, confirming the adequacy of the approach to detect pattern occurrences with high accuracy.

For ease of understanding and simplicity, section headings are utilized in this disclosure, but the section headings are not meant to be limiting.

1. Introduction

Domain-specific modeling languages (DSML) are high-level languages specific to a particular application domain. Unlike general-purpose modeling languages, such as UML, a DSML uses familiar terms and concepts to a domain allowing its users to learn it faster. Historically, the adoption of DSMLs had been impeded by the onerous task of building specific tools for them like (textual/graphical) editors, compilers, debuggers, translators, and analyzers for each modeling language. However, over the past decade, strong interest in model-driven engineering (MDE) has led research into developing technologies and tools that generically support the definition and use of DSMLs.

The main foundation upon which these technologies are built is the abstract syntax (AS) of a DSML. The abstract syntax describes language primitives whose semantics are familiar to all practitioners in a domain. One of the most common formalisms for defining abstract syntaxes is the Meta Object Facility (MOF). A model describing the AS of a DSML in MOF is called a metamodel. Examples of metamodel-based DSMLs include BPMN 2.0 (Business Process Modeling Notation) and Diagram Definition. Even though UML is most widely used for object-oriented software design, and thus can be considered domain-specific, it is not generally classified as a DSML. On the other hand, the AS of UML is defined with a MOF metamodel too. Hence, technologies and tools that apply generically at the metamodel level to MOF-based DSMLs equally apply to UML and vice versa. In the context of this disclosure, we present an approach that falls into this category and thus when we talk about technologies for MOF-based DSMLs we mean to include UML as well.

Another mechanism commonly used to define the AS of a DSML is a UML profile. A profile allows UML to be customized for a particular domain using a set of stereotypes (defining new attributes and constraints). Examples of profile-based DSMLs include SysML, for systems modeling, and MARTE, for modeling real-time embedded software. Unlike a metamodel, the syntax of a profile is defined with UML (vs. MOF).

One of the foundational technologies that work on the abstract syntax of a language is model analysis through the detection of occurrences of known design patterns. A design pattern is a best practice solution to a standard design problem. As a modeling and design tool, a design pattern specifies a structure of constrained and inter-related model elements. In the context of a DSML, such structures need to be formally specified, indicating how (DSML) model elements play roles in a solution to a domain-specific design problem. Each DSML may have its own unique set of design problems and best practices. For example, a DSML for modeling electronic circuits may have a design pattern consisting of logic gates arranged and interconnected in specific ways to optimize a particular function. Hence, it may be beneficial for a user to have a technology that allows each DSML to specify and detect its own unique design patterns according to exemplary embodiments. It is may also be beneficial that such technology works consistently for all DSMLs to enable the development of a generic tool, reducing the cost for tool developers and the learning curve for practitioners according to exemplary embodiments. Conversely, some DSMLs may have a similar set of design problems and best practices and therefore it may also be beneficial to specify their design patterns in a generic way that can be reused across those DSMLs according to exemplary embodiments.

A motivation for the specification and detection of DSML design patterns is assisting users with the comprehension and maintenance of DSML models. Modern systems are becoming larger, more complex and often developed with tight deadlines and frequently changing requirements. This means that design documentation is often missing or, if available, may not exactly reflect the built system. The benefits of using design patterns, as well-understood building blocks of design, would be compromised without knowledge of where they have been used. Therefore, a technology that helps detect occurrences of design patterns in existing models becomes important for the ongoing comprehension, maintenance, and documentation of the system in accordance with exemplary embodiments. Other uses of this technology include detecting anti-patterns (design flaws), checking design conformance, and assisting pattern-based evolution.

Most existing approaches to detect design patterns focus on detecting them in either the source code or a design model in UML. Some of these approaches express patterns at the model level (i.e., using an instance of the DSML) but not the more generic metamodel (language) level. Other approaches need to be customized every time for new patterns. Such approaches cannot be reused for different patterns without a significant effort. Another concern is the ability to manage the complexity of patterns. Different patterns often share common parts while others have several variants. Some existing approaches do not have reuse semantics (like composition or inheritance) and therefore are harder to use to support these cases. Others may require technologies and/or tools that are harder for tool developers to build or integrate with existing modeling infrastructure.

In this disclosure, exemplary embodiments provide a generic approach to specify arbitrary design patterns for any DSML and detect the pattern occurrences in models conforming to that DSML. The approach can focus on design patterns of MOF-based DSMLs (such as those defined with a MOF metamodel). This approach can also focus on the ability to specify unique patterns for any DSML accurately.

Our newly proposed approach is based on model transformation techniques. More specifically, our approach may use a QVTr (Query/View/Transformation Relations) transformation (which may be referred to as pQVT herein), where each pattern is specified declaratively as a relation between metaclasses of a given DSML playing roles in the pattern and metaclasses of a new DSML (named pResults). The new DSML named pResults is designed specifically for compactly representing pattern occurrences according to exemplary embodiments. Detection is then performed by executing the transformation on an input model, looking for occurrences of specified patterns, and generating a pResults model containing the detected occurrences.

Our approach offers several features that make it a practical: First, QVTr is a transformation formalism that generically works on the abstract syntax of MOF-based DSMLs. This gives the approach the ability to specify patterns for arbitrary DSMLs without the need to customize the formalism and/or the detection algorithm. Second, QVTr is a highly declarative rule-based language. Every rule specifies a constrained relation between specific metaclasses in a DSML. This allows patterns, which are defined as rules, to concisely specify how pattern participants (instances of metaclasses) relate to each other and to the roles they play in pattern occurrences (instances of metaclasses in pResults). Third, expressions in QVTr are specified using the Object Constraint Language (OCL), which is based on first-order predicate logic with set semantics and is often used as a constraint language when defining MOF-based DSMLs. Modeling practitioners who would be responsible for specifying patterns using the disclosed approach would typically be experienced individuals with knowledge of their domain and the way their DSML is expressed in MOF, and therefore would also likely know OCL. Fourth, QVTr has built-in reuse semantics allowing rule composition and therefore pattern composition. QVTr also has support for utility queries which, along with rule composition allow for a modular approach to defining patterns where complex patterns are defined by composing simpler ones and where pattern variability is managed by refactoring out the common logic. Fifth, since pQVT is based on QVTr, it has well defined execution semantics, which we reuse as pattern detection semantics (i.e., in our approach we do not have to define new detection algorithms; instead the QVTr transformations are implemented as the pattern detection algorithms according to exemplary embodiments). Sixthly, QVTr has both a textual and a graphical concrete syntax. This allows pattern definitions to be specified/viewed using either notation depending on user preference.

Now turning to FIG. 1, FIG. 1 illustrates a block diagram 100 of a computer 10 having various software and hardware elements for implementing exemplary embodiments.

The diagram 100 depicts a computer 10 which may be one or more servers and/or any type of computing device. The computer 10 may include and/or be coupled to memory 15, a communication interface 40, display 45, user interfaces 50, processors 60, and software 20. The communication interface 40 comprises hardware and software for communicating over a network. The user interfaces 50 may include, e.g., a track ball, mouse, pointing device, keyboard, touch screen, etc, for interacting with the computer 10, such as inputting information, making selections, defining pattern specification as relations, selecting input models, etc.

The computer 10 includes memory 15 which may be a computer readable storage medium. One or more applications such as the transformation language application 20 (e.g., a software tool) may reside on or be coupled to the memory 15, and the transformation language application 20 comprises logic and software components to operate and function in accordance with exemplary embodiments in the form of computer executable instructions. The transformation language application 20 may include a graphical user interface (GUI) which the user can view and interact with. The transformation language application 20 may represent numerous software components (or modules) according to exemplary embodiments.

2. QVTr: Query/View/Transformation

The Query/View/Transformation (QVT) is a specification by the Object Management Group (OMG), and the QVT is implemented in the transformation language application 20. It defines a standard way to transform between MOF-based models using model transformation rules. QVT defines three DSMLs: Core, Relations and Operational. The last two are declarative languages defined at different levels of abstraction (Relations being defined at a higher level). The Operational language is an imperative language that provides constructs commonly found in imperative languages, such as loops and conditions. Exemplary embodiments can use QVT-Relations (QVTr) for pattern specification due to its declarative syntax and higher level semantics. The abstract syntax of QVTr is defined using minimal extensions to OCL and MOF. Moreover, the language has both a textual and a graphical concrete syntax. All of this simplifies pattern specifications as further demonstrated herein. We will first use an example to illustrate the main concepts of a QVTr transformation. The example transforms an input model 22 conforming to UML (e.g., such as an input DSML 25) into an output model 24 conforming to RDBMS (e.g., such as an output DSML 26).

2.1 Transformation and Model Types

In QVTr, a transformation between two candidate models, such input models 22 and 24, is specified as a set of relations that must hold for the transformation to be successful. A candidate model may be any model that conforms to a MOF-based DSML. Candidate models are declared with names and types, representing the DSMLs that restrict the kinds of elements they can contain. An example in FIG. 2A declares a transformation (in the transformation language application 20) named UMLToRDBMS between two candidate models: uml, declaring UML as its DSML (type), and rdbms, declaring RDBMS (a language for database schema definition) as its DSML. The transformation contains a number of relations (rules) specifying its logic.

A transformation by the transformation language application 20 can be invoked either to check two models 22 and 24 for consistency (based on the relations) and/or to modify one model to enforce consistency in that model (such as output model 24). A transformation invoked for enforcement is executed in a particular direction by selecting one of the candidate models as the source, e.g., input model 22 and the other as the target such as output model 24. The execution by the transformation language application 20 attempts to make the relations hold by creating, deleting, and/or modifying elements in the output model 24 only. Instead of conventionally transforming the input model 22 to result in the output model 24 (for normal QVT transformation), exemplary embodiments utilize the transformation 30 as a pattern specification to find pattern occurrences in the input model 22. As such, the transformation language application 20 finds the different pattern occurrences that are in the input model 22, and outputs them in a pResults (output) model 24; pResults is a target DSML 26 designed to represent pattern occurrences compactly.

2.2 Relations and Domains

Relations in a QVTr transformation declare constraints that must be satisfied by elements of the candidate models. The relations are executed by the transformation language application 20; in exemplary embodiments, the relation is defined in terms of the transformation 30. A relation is specified with a name, an ordered set of parameters (called domains) that represent related elements from the candidate models, and a set of constraints on those parameters. The reason a parameter is called a domain refers to basic definitions in mathematical functions. Assume you have a real function f(x). The domain of f(x) is the set of legal values of x that make the function output real values. In other words, the domain of a function is the set of constraints on the values of its parameters. Similarly, in QVTr, a parameter of a relation, through its constraints, specifies the set of model elements that can bind to it, and thus is called a domain of the relation. QVTr relations can have more than one domain since they can be executed in more than one direction. (In contrast, in mathematics, a function has one domain and one range since it executes always in one direction.) The constraints that can be specified for a domain include its type (such as, e.g., a metaclass that is the type of elements bound to that domain), specific values for its attributes, and specific association links to other related elements.

Relation domains also represent the set of elements that must be located, modified, created and/or deleted in a candidate model (such as the output model 24) in order to satisfy the relation. In FIG. 2B, an example is the relation PackageToSchema, between a UML package and an RDBMS schema because we want to transform packages into schemas (in this example). The relation is declared with two domains that match elements in the uml and rdbms models, respectively. Each domain specifies a simple element: a UML package p and a RDBMS schema s. Both elements are specified with their name attributes bound to the same variable pn implying that they should have the same value.

A relation can also define nested variables within domains representing model elements constrained to be involved in relations with the domain elements through specific association. Unlike domains, nested variables are not considered as parameters of a relation, but more like local variables. For example, FIG. 3 illustrates a relation ClassToTable between a domain c of type Class and a domain t of type Table. Notice that the domain c is nesting a variable p of type Package and is related to it through the package association (from the UML metamodel). Similarly, the domain t is nesting variable s of type Schema and is related to it through the schema association (from the RDBMS metamodel). While these examples show direct nesting by a domain, variables can also be nested recursively to any depth. Variables are uniquely identified by their names in the scope of a relation. This means that all occurrences of a variable with the same name in a relation must refer to the same value. Repeating variables in more than one place in the relation (e.g., the variable pn in FIG. 2B and variable cn in FIG. 3) is often used to establish traceability between different elements in a relation.

A relation can be constrained by two sets of predicates, a when clause and a where clause. The when clause specifies the conditions under which the relation needs to hold. For example, the relation ClassToTable (in FIG. 3) needs to hold between class c and table t only when the PackageToSchema relation holds between package p (containing c) and schema s (containing t). The where clause is used to extend a relation to specify other relations that must hold when this relation holds. For example, whenever the relation ClassToTable holds between class c and table t, the relation AttributeToColumn needs also to hold between them. This effectively makes the when and where clauses two forms of relation composition, where the domains of the composed relation get bound to values from the composing relation. As mentioned earlier, the domains of a relation is an ordered set, hence when composing a relation, the values need to be bound to the domains in the same order. For example, notice how the composition of relation PackageToSchema in the when clause (in FIG. 3) binds variables p and s, respectively, to the domains of the relation in FIG. 2B.

A transformation contains two kinds of relations: top-level (marked as top) and/or non-top-level. The execution of a transformation (by the transformation language application 20) requires that all top relations hold, whereas non-top relations are required to hold only when they are composed directly or transitively from the where clause of another relation. In our example in FIG. 4, PackageToSchema and ClassToTable are top relations, whereas AttributeToColumn is a non-top relation (composed by the where clause of ClassToTable).

As mentioned above in Section 2.1, a transformation can be executed (via the transformation language application 20) to enforce consistency between candidate models 22 and 24 by choosing one of them as target. Whether each relation is going to be enforced is determined by its target domain being marked as checkonly and/or enforce as show in FIG. 5. When the relation is marked as checkonly, the execution just checks to see if there exists a valid match in the relevant model that satisfies the relationship. However, when it is marked as enforce and if the check fails, the target model is modified so as to satisfy the relationship. In the example relation in FIG. 5, the domain for the uml model is marked as checkonly and the domain for the rdbms model is marked as enforce. This means that assuming we are executing the relation from the rdbms domain to the uml domain, and there exists a schema in rdbms for which we do not have a package in the uml model with the same name, then this is reported as an inconsistency between the two domains. However, assuming we are executing the relation in the direction of the rdbms domain, and there exists a package in the uml model for which there is no schema in rdbms model with the same name, a new schema is created and given that name.

2.3 Graphical Notation

QVTr (e.g., implemented in the transformation language application 20) allows relations to be specified using a graphical notation that is based on the UML object diagram notation. This is due to the relation's domains representing a collection of objects, links and values, the type of information typically visualized by UML object diagrams. The example in FIG. 6 uses a graphical notation to show the ClassToTable relation which was defined previously in FIG. 3. The relation is represented using a rectangular shape 300 with a hexagon shape 305 in the middle representing the two related candidate models uml and rdbms on left and right sides. The C annotation means that the uml domain is marked checkonly, while the E annotation means the rdbms domain is marked enforce. Elements in both domains 310 and 320 are represented by object shapes on both sides of the hexagon 305 with the domain objects marked with keyword <<domain>>. Attribute values are specified in separate compartments in the object shapes and association links are represented as lines connecting object shapes. The where and when clauses have their own compartments 325 and 330 respectively within the main relation shape 300.

2.4 Object Creation and Keys

As mentioned above, a domain marked as enforce serves to locate, update, delete, and/or create objects in a target model. However, when creating objects it is to be ensured that duplicate objects are not created, for instance by different relations, when the required objects already exist. While MOF allows a single attribute of a class to be nominated as a unique identifier of instances, in some metamodels more may be needed. That is why QVTr introduces the concept of a key, which defines a set of attributes of a class that uniquely identify an object instance of the class in a model. A class may also have multiple keys (as in relational databases). In our running example, we can specify that in a RDBMS model, a Schema is uniquely identified by its name attribute, while a Table is uniquely identified by two attributes: its name and the schema it belongs to, as shown in FIG. 7. FIG. 7 shows an example of the unique keys of RDDMS.

2.5 Transformation Queries

Different QVTr relations often specify similar if not identical when and/or where constraints. Since repeated code is hard to maintain and tends to increase the size of transformations, QVTr introduces the concept of reusable queries. A query is a side-effect-free operation (with an ordered set of parameters) owned by a transformation and can be invoked (with an ordered set of values) from any OCL expression in the transformation, i.e., any when or where constraint. The body of a query can be specified by an OCL expression, and/or it may be omitted to indicate the query is implemented externally to the QVTr language in a platform-dependent way (the term for this in the QVT spec is a black-box query) like with Java® software. The example in FIG. 8 shows a relation with an example query called areAllAttributesSingular, whose body is specified in OCL to check if a given UML class has all its attributes as singular, i.e., with a lower bound smaller than or equal to 1 (FIG. 17 shows a subset of the UML metamodel where the relations used in this OCL expression are defined). The query is invoked from the when clause of relation ClassToTable, i.e., mapping only those classes with singular attributes to a table.

2.6 Execution Semantics

As mentioned in Section 2.1, QVTr transformations by the transformation language application 20 can be invoked to check and/or enforce consistency between candidate models 22 and 24. In both cases, the transformations have well-defined execution semantics. In this section, we summarize the enforcement semantics as they are used as detection semantics for pQVT discussed further in Section 3 according to exemplary embodiments. Recall that a transformation invoked for enforcement is executed in a particular direction by selecting one of the candidate models as a target. In this case, all top relations get executed. As top relations are not ordered, the only constraint on their execution order is that when relation A composes relation B in its when clause (top relations cannot be composed in where clauses) then relation A cannot finish executing until relation B finishes executing first.

When a relation is executed, the execution engine (e.g., the transformation language application 20) in the first tries to bind elements from the source model(s) to variables defined by the relation's source domains. To do that, the engine (e.g., the transformation language application 20) searches the input models 22 for a combination of elements that satisfy those variables' constraints including those in the when clause. For each unique combination, the engine (e.g., the transformation language application 20) enforces the relation's target domain (assuming that the domain is marked enforce). This results in possible changes to the output model 24 to satisfy the constraints on the variables defined by the target domain including those constraints in the where clause. If executing a relation resulted into a binding of values to its domains, the relation is said to hold for these values. Furthermore, when a relation is composed in a when clause as a constraint, the engine decides on the constraint by checking whether the composed relation holds for the values bound in that composition. However, when a (non-top) relation is composed in a where clause, the engine executes such a relation by binding the values of the composition to the domains of the relation.

3.0 pQVT

According to exemplary embodiments, the disclosure provides a new approach to discovering pattern occurrences in a model (the approach may be referred to as pQVT); pQVT allows practitioners of any MOF-based DSML to specify design patterns (through a QVTr transformation 30) specific to that DSML and detect them in their user models such as in the input model 22. The approach allows practitioners to specify design patterns with a QVTr transformation 30 (by the transformation language application 20) between metaclasses from a DSML 25, playing roles in patterns, and metaclasses from a newly-defined general-purpose pattern result DSML 26, called pResults. The output pResults model 24 comprises the pattern occurrences. The pResults model 24 allows the organization of the detected pattern occurrences in a compact tree data structure for display on display 45 to facilitate their inspection by users.

In this section, we show how pQVT implemented in the transformation language 20 leverages the concise syntax and rich semantics of QVTr to specify design patterns (as transformations 30) precisely and to detect their pattern occurrences. We start by describing the new pResults DSML 26 in Section 3.1. In Section 3.2, we introduce the Adapter design pattern as an example pattern (from the GoF family) for an example MOF-based DSML 25 (UML in this case). To ease the understanding of the approach, we use the Adapter pattern as a running example to gradually show in Section 3.3 the processes and techniques used to define an accurate (in terms of precision and recall) pattern specification 30.

3.1 pResults Language

In this section, we present pResults as a new target DSML 26 that we defined for compactly representing pattern occurrences of any design pattern for any MOF-based DSML 25 according to exemplary embodiments. A pattern occurrence is a unique mapping of pattern roles to the elements playing those roles in an input model 22. A common representation for a pattern occurrence in the literature is a flat collection of role bindings, where each role binding specifies which model element plays which role. Assume the transformation language application 20 detects pattern occurrences of the GoF Composite design pattern (that is input as the pattern specification 30), which has three roles: Component (Role1), Composite (Role2) and Leaf (Role3). Suppose the transformation language application 20 finds/displays that class E1 is a Component, that it has two Composites (E2 and E3) and two Leaves (E4 and E5). FIG. 9 on the left shows that four unique collections 905 of role bindings would be identified, one for each triplet (Component, Composite, Leaf). The main issue of this representation (i.e., collections 905) is scalability with potentially huge number of unique collections with similar role bindings. This can stretch the computing resources required for the detection process and can consume excessively long time from a user to inspect the results.

In exemplary embodiments, an alternative provided by pResults output model 24 may be to represent pattern occurrences as a tree 910 of role bindings as shown on the right in FIG. 9, which is the output of the (pQVT) transformation language application 20. In the tree 910, each role (e.g., roles 1, 2, and 3) is bound in a different level resulting in a unique pattern occurrence being a complete branch shown as branches 915 from the root of the tree 910 down to a leaf. This representation allows pattern occurrences with similar role bindings to share sub-branches, thus reducing the overall foot print of the result. In addition, by ordering (via a user feature in the GUI of the transformation language application 20) the levels of role bindings from highest to lowest (based on their importance) in the tree 910, a user can inspect the result by selectively drilling down the tree (gradually revealing finer details).

In order to represent this tree 910 structure of pattern roles, we utilized a MOF modeling tool (which can be integrated in or with transformation language application 20) to define the MOF class diagram (metamodel) of pResults in FIG. 10. FIG. 10 shows the pResults metamodel of the output model 24 which will be used by the transformation language application 20 as a target DSML 26 to represent the pattern occurrences found in the input model 22 according to exemplary embodiments. In FIG. 10, the class Category 1010 represents a namespace for pattern occurrences. It has a name attribute and a pattern collection. The class Pattern 1015 designates a specific pattern 30 in a category and has a name. For example, the Composite pattern (as specified in the pattern specification 30) would be represented as an instance of Pattern named "Composite" which is owned by an instance of Category named "Structural". A pattern 30 also has a rootBinding collection, representing the root nodes of each occurrence (tree of role bindings) of the pattern. The class RoleBinding 1020 has a role attribute representing the name of a role in the pattern (defined in the pattern specification 30) and an element attribute referencing a model element (in the DSML model) bound to that role. The model element in the input DSML model 22 is typed by MOF::Element 1025, which is the implicit super class of all MOF-based DSML metaclasses, allowing reference to any domain-specific model element. The class RoleBinding 1020 also has a childBinding collection, representing role bindings at the next level down the pattern occurrence (tree of role bindings), and a Boolean attribute is Main indicating whether the role is a main one. Although all role bindings in a particular pattern occurrence contribute to its uniqueness, the main role bindings are the subset that conveys the most important information about it. The pattern occurrence representation 910 in FIG. 9 can be represented as an instance of the pResults metamodel in FIG. 10. Each node in the tree 910 is a RoleBinding instance that binds a given role (e.g., Role1, Role2) to a given element (e.g., E1, E2) form in the input model 22.

3.2 Example Design Pattern

In order to facilitate the description of pQVT, we will use the Adapter pattern (which is one of the GoF design patterns) as a running example to illustrate the pattern specification as a relation in QVTr transformation 30. Like most GoF patterns, the Adapter pattern is often used in the context of object-oriented software design with UML. Although the pattern is classified as structural in the GoF catalog, it actually includes both structural and behavioral constraints making it representative of the complexity found in the catalog as a whole. In addition, while most GoF patterns are specified with one official variant in the original text, the Adapter pattern is specified with two variants, Class Adapter and Object Adapter, making it a more compelling example to illustrate in the context of pattern variability.

Figure 11:
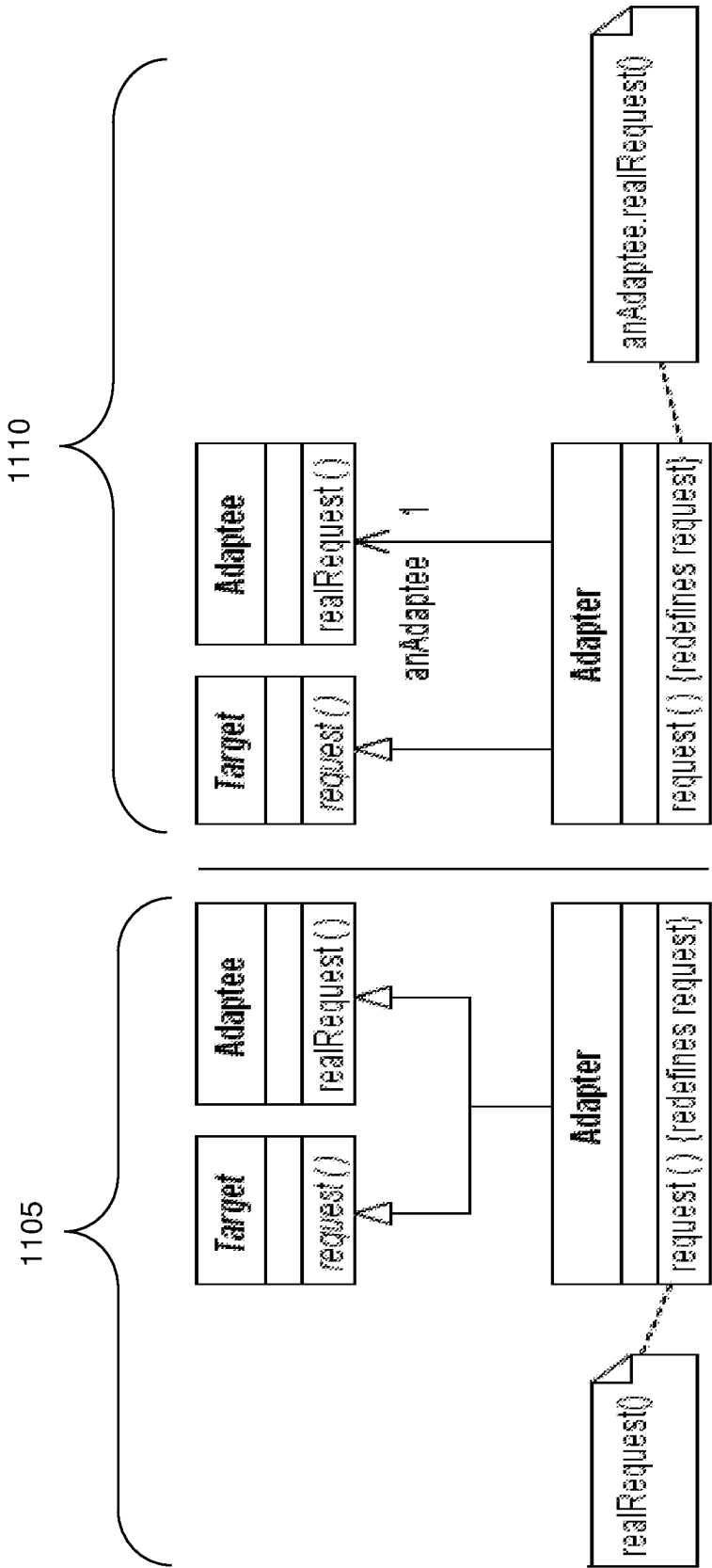
FIG. 11 illustrates an example of two variants of a pattern.

The Adapter pattern is utilized as an example illustrate translating one interface for a class into another compatible interface. In this way, the Adapter pattern allows classes to work together that normally could not because of incompatible interfaces by translating calls to its interface into calls to the original interface. FIG. 11 shows two variants (left 1105 and right 1110) of the Adapter pattern using UML class diagrams. In both variants 1105 and 1110, the new Interface is represented by the abstract class Target defining the abstract operation request. Similarly, the original interface is represented by the class Adaptee defining an operation realRequest. In the Class Adapter variant 1105, the Adapter class specializes both classes and redefines the request operation to delegate to the inherited realRequest operation. In the Object Adapter variant 1110, the Adapter class specializes the class Target, aggregates the class Adaptee, and redefines the operation request to delegate to the realRequest operation on the aggregated instance anAdaptee.

3.3 Pattern Specification

In this section, we progress through the process and techniques of specifying design patterns as pattern specification 30 with pQVT according to exemplary embodiments.

3.3.1 Getting Started

The first step is identifying the different roles in the design pattern and the types (metaclasses) of elements playing those roles. For example, based on the semantics of the Adapter pattern presented in Section 3.2, the pattern roles (common to both variants) are Target, Adapter and Adaptee (all of type UML::Class), and request and realRequest (both of type UML::Operation). At this point, the pattern can start to be specified (via the transformation language application 20) as a relation in a QVTr transformation 24 between a model such as the input model 22 conforming to the DSML 25 of the pattern (UML in this example) and a model such as the input model 24 conforming to pResults 26. The relation (which is pattern specification 30) specifies how classes of the DSML 25 (which play roles in the pattern) map to a pattern occurrence (a tree of role bindings) represented in output pResults 26.

FIG. 12 illustrates a transformation 1200 having a relation which is a GoF transformation with relation Adapter Pattern. In exemplary embodiments, the relation 1200 which is the Adapter pattern is defined as a pattern specification 30 (also referred to as design pattern, pattern, pattern design) for the QVTr (which is called pQVT because the transformation with the relation 1200 will be utilized to find the pattern occurrences of the pattern specification 30 as pResults model 24, instead of transforming one model into another model). For example, FIG. 12 shows a QVTr transformation 1200 named GoF between a model named uml (conforming to UML) representing the source input model 22 and a model named presults (conforming to pResults) representing the output model 24. The transformation executed by the transformation language application 20 defines a top relation named AdapterPattern to specify the Adapter pattern. Each role in the pattern is represented by a separate uml domain (in the relation) named after the role name and typed by the metaclass playing that role. In this case, five uml domains are defined: Target, Adapter and Adaptee (all typed by Class), and request and realRequest (both typed by Operation). The relation also defines a single presults domain that specifies a pattern occurrence 30 using a tree of pResults variables. The tree starts at the top with variable c of type Category (variable c is chosen as a domain since it is the top most) with a name value of "Structural". The category c nests a variable p of type Pattern with a name value of "Adapter". The pattern p nests a tree of variables (rb1 to rb5) of type RoleBinding with name values equal to the role names (e.g., rb1's name is "Target") and element values equal to variables with identical names to those of the corresponding uml domains (e.g., rb1's element is bound to Target). The RoleBinding variables are ordered down the tree in a way that reflects the relative importance of the role they represent. Notice that the uml domains of the relation are marked as checkonly, as the uml model as input model 22 is not expected to be modified during pattern identification, i.e., during execution of the transformation by the transformation language application 20, while the presults domain is marked as enforce, as the presults model as output model 24 is expected to be modified (to report pattern occurrence results) according to exemplary embodiments. The pattern occurrences are reported in the output pResults model 24 and displayed on the display 45.

In FIG. 13, the relation 1200 (i.e., pattern specification 30) which is relation AdapterPattern is shown in graphical notation as relation 1300 on the display 45 by the transformation application 20. The Adapter Pattern relation 1200 and 1300 are identical in how they cause the QVT transformation application 20 to locate pattern occurrences of the pattern specification 30 defined in the relation 1200 and 1300. In the graphical notation, the boxes on the left (the uml side) represent the roles of the pattern, while the boxes on the right (the presults side) represent the role bindings making up the pattern occurrences. The relations between both sets of boxes represent the references from the role bindings to the elements playing those roles in the input model 22.

When the transformation of the pattern specification 30 is executed by the transformation language application 20 in the direction of (pResults) output model 24, the pResults variables gets enforced (i.e., changes could be made to the output model 24 to enforce consistency) because the presults domain (marked as enforce) becomes the target domain and the uml domains become the source domains. The execution by the transformation language application 20 first tries to find combinations of elements from the uml model that satisfy the constraints of the uml domains (according to the pattern specification 30). (Notice that so far the constraints being defined in the relation are the types of the uml domains; more constraints will be discussed and added in the next sections.) For each unique combination of elements matching the uml variables, the execution by the transformation language application 20 enforces the presults domain (i.e., locates, modifies, creates and/or deletes objects in the (pResults) output model 24) to satisfy the domain's constraints. Before the transformation is executed by the transformation language application 20 for the first time, the (presults) output model 24 is empty and thus enforcing the presults domain leads to the creation of the tree (such as the tree 910) of elements (i.e., the pattern occurrences) specified by the domain variables; all of which results in the output pResults model 24. The tree includes RoleBinding elements, whose element attributes are specified to equal variables with identical names to those of the uml domains. This results in those attributes being bound (by the transformation language application 20) to the same combination of UML elements that were bound to the uml domain variables. FIG. 14 shows an example of binding the variables of the AdapterPattern relation (e.g., specified in the pattern specification 30) to a conforming combination of UML elements by the transformation language application 20 according to exemplary embodiments. On subsequent executions of the transformation by the transformation language application 20, the (pResults) output model 24 gets modified to report the detection results. When no conforming combination of UML elements has been detected in the input model 22, pattern occurrences are not created (and/or get deleted if they were created previously) in the output pResults model 24 by the transformation language application 20.

In order to avoid creating duplicate elements in the presults model which will result in the pResults output model 24, we can define unique keys for the pResults metaclasses, as shown in chart 1500 of FIG. 15. Notice that the keys include attributes that represent the possible containers of the classes (derived from the pResults metamodel in FIG. 10). For example, the key for the class Pattern includes the container attribute category. Similarly, the two keys for class RoleBinding include the container attribute pattern in the first key and the container attribute parentBinding in the second key. The reason we included these container attributes is to ensure that the created objects are locally unique under their containers vs. globally unique across the whole model. Global uniqueness is not needed since, for example, the same role binding (i.e. role name and element reference) may be created in different role binding branches.

3.3.2 Precision

With the understanding of a pattern specification 30 in QVTr according to exemplary embodiments, the next step is to improve precision, i.e., the ratio of detected pattern occurrences that are actually valid, by adding constraints to the pattern relation (i.e., the pattern specification 30). So far, the uml domains of the relation have (only) been constrained by their types (i.e., the DSML metaclasses playing roles in the pattern). For example, the relation in FIG. 12 binds any class from a UML model to the Target, Adapter and Adaptee roles and any operation to the request and realRequest roles. One may desire to increase precision. To improve precision in the pattern specification 30 defining a relation, we can discover and add the missing constraints to the uml domains according to exemplary embodiments.

In one implementation of exemplary embodiments, a way to discover the missing constraints is by analyzing the textual and/or graphical (e.g., a class diagram) description of the pattern. In some case, the description may be ambiguous, and this is addressed further in Section 3.3.3. For now, another option is to deduce basic constraints from the description to enhance the precision of the pattern specification 30. For example, analyzing the description of the Adapter pattern in Section 3.2 indicates that there are two variants 1105 and 1110 of the pattern that share some constraints and differ in others. The shared constraints include that the Target class is abstract and owns an abstract request operation, that the Adapter class has a generalization to the Target class and redefines the inherited request operation (by a concrete one) and that the Adaptee class owns a realRequest operation. The specific constraints for the Class Adapter variant 1105 include that the Adapter class has a generalization to the Adaptee class and that it implements the request operation to delegate the call locally to the realRequest operation inherited from Adaptee. The specific constraints for the Object Adapter variant 1110 include that the Adapter class aggregates the Adaptee class and that it implements the request operation to delegate the call to the realRequest operation on the aggregated anAdaptee object.

In exemplary embodiments, a way to add these constraints to the relation 1200 in FIG. 12 is to leverage the relation composition mechanism of QVTr (discussed Section 2.2). Specifically, for the relation 1600 show in FIGS. 16A and 16B, exemplary embodiments add the shared constraints to the AdapterPattern relation 1602 and define two new relations ClassAdapterPattern 1605 and ObjectAdapterPattern 1610, which extend the former relation 1200 by being composed in its where clause, as shown in relation 1600 in FIGS. 16A and 16B. The relation 1600 is a pattern specification 30 which builds upon the relation 1200. Each composition binds values from the composing relation to the domains of the composed relation. In this case, we bind the domains of AdapterPattern relation 1602 to the corresponding domains of the variant relations 1605 and 1610. This has the effect of further constraining the domains by the constraints specified in the variant relations 1605 and 1610. Furthermore, we refactor the AdapterPattern relation by moving the presults domain down to each of the variants relations 1605 and 1610. The reason for that is because we want the presults model (that results in the output pResults model 24) to get modified only when we have considered all the constraints of each variant 1605 and 1610. Notice that in the composition of the two variant relations 1605 and 1610 (bottom), their presults domain is bound to the value null because no value exists for it in the AdapterPattern relation 1602.

Adding the constraints to the domains require knowledge of the metamodel of the DSML 25. For example, FIG. 17 shows a class diagram depicting a subset of the UML 2 metamodel that is relevant to the constraints of the Adapter pattern. The FIG. 17 contains various attributes and associations that are used to constrain the pattern specifications 30. For example, the Target class in FIG. 17 is constrained to have a value of true for its Class::isAbstract attribute effectively requiring the class to be abstract. Another example is the Adapter class in the same figure that is constrained to own an operation request2 in its Class::ownedOperation collection. The operation is constrained to be concrete (i.e. BehavioralFeature::isAbstract equals false) and to reference the inherited operation request from its Operation::redefinedOperation collection when run by the transformation language application 20.

The new variant relations 1605 and 1610 in FIG. 16B add constraints specific to their variants. For example, ClassAdapterPattern 1605 adds a constraint to class Adapter requiring it to have Adaptee as a superclass. Also, ObjectAdapterPattern 1610 adds a constraint to property anAdaptee requiring it to have class Adaptee as a type and to have its multiplicity (lower and upper) as 1. Notice that operation request2 is also defined as a domain in each of the variant relations 1605 and 1610 so that it can further be constrained. For example, relation ClassAdapterPattern 1605 defines a when clause constraint requiring operation request2 to call inherited operation realRequest directly. The constraint is defined by query directLocalCall (a local call is made to an operation on the same object). Similarly, relation ObjectAdapterPattern 1610 defines a when clause constraint requiring operation request2 to call operation realRequest on attribute anAdaptee directly. The constraint is defined by query directDelegationCall (a delegation call is made to an operation on an aggregate object).

Referring to FIG. 18, both directLocalCall and directDelegationCall are specified in more detail in FIG. 18 (lines 1 and 2). Their logic is based on the transformation language application 20 inspecting the behavioral information, if available in the input model 22, to determine if one operation (caller) calls another operation (callee). In one implementation, the transformation language application 20 inspects two kinds of behavioral information for operations: post-conditions (expressed in OCL) and behavior (expressed with sequence diagrams) in FIG. 18. Notice that UML 2 calls the behavior of an operation its method. If none of this information is available, the queries return true when executed by the transformation language application 20. Although this may affect precision (which is addressed further in Section 3.3.4), it would preserve recall in this particular case.

For post-conditions, the transformation language applications 20 analyzes the abstract syntax tree (AST) of the OCL expressions looking for calls to the callee operation. For example, consider operation Account::totalFee( ):Integer with a post-condition: result=variableFee( )+plan.fixedFee( ). When analyzing the AST for this expression shown in FIG. 19, the transformation language application 20 finds CallOperationExp nodes for operation variableFee on the source variable self (i.e., a local call) and operation fixedFee on the source property plan owned by self (i.e., a delegation call). However, a normal QVTr does not directly support analyzing OCL expressions, thus we implement this analysis using a QVTr black-box query as shown in lines 5 and 6 in FIG. 18. Recall from Section 2.2 that such a query is defined with no body in the transformation and the actual body is provided externally in an implementation-dependent way. In this case, the implementation may be done with the Java™ API of the MDT OCL project.

On the other hand, analyzing sequence diagrams by the transformation language application 20 can be specified using queries with OCL bodies. FIG. 20 shows a sequence diagram specified as a behavior for the same operation Account::totalFee( ):Integer discussed earlier. Notice that specifying operations' behavior with sequence diagrams is a design practice that is not utilized in mainstream textbooks on software engineering. Instead those books promote the description of sequence diagrams for use cases. In such sequence diagrams, however, we would still be able to find the specification of behavior in terms of messages being exchanged between classes. Analyzing such sequence diagrams as shown in FIG. 20 may be represented in the queries at lines 3 and 4 of FIG. 18.

When executed by the transformation language application 20, the logic of these queries (at lines 3 and 4 in FIG. 18) is to take the Interaction (sequence diagram) representing the caller operation's method (i.e., behavior) and search inside it for a synchCall message that references the callee operation as a signature. The message starts from a lifeline representing an instance self of the class. If the message (e.g., variableFee) ends on the same lifeline, then it represents a local call as determined by the transformation language application 20. However, if the message (e.g., fixedFee) ends on a lifeline representing the link element, then it represents a delegation call as determined by the transformation language application 20.

3.3.3 Recall

In the previous section, we discussed how to improve the precision of a pattern specification 30 by adding constraints to the QVTr relation (i.e., the pattern specification 30). Constraints ensure that only valid combinations of elements are bound to the roles in the reported pattern occurrences. However, precision is just one side of accuracy; the other side being recall, which is the ratio of valid pattern occurrences in the input model 22 that actually get detected according to the pattern specification 30. There tends to be a tradeoff between precision and recall. If one over-constrains a specification, precision improves but recall may suffer, as valid occurrences may not get reported. Conversely, if one under-constrains a specification, recall improves but precision may suffer, as more (valid and invalid) occurrences get detected. The balance is always to find a good compromise between the two metrics.

In this section, we discuss strategies for enhancing recall that a practitioner can apply when specifying design patterns as pattern specifications 30 for a given DSML using pQVT transformation language application 20. The issue is the lack of formality of the pattern description. Patterns are often described with informal textual and/or graphical notations. For example, the description of the Adapter pattern in Section 3.2 uses text and a class diagram in FIG. 11. This description may still be considered a little unclear (ambiguous). For example, the Object Adapter variant 1110 shows a multiplicity of 1 for the anAdaptee attribute, specifying a single instance of Adaptee to delegate to, but one may wonder whether a weaker multiplicity of 0 . . . 1 is also valid. Another example is the direct generalization from Adapter to Target shown in the diagram. One may also wonder if an indirect generalization, a weaker constraint, is also valid. A third example is the direct call from the request operation to the realRequest operation. Depending on the intended semantics, one may also consider the weaker constraint of an indirect call.

In order to (resolve these ambiguities) provide more clarity, a pattern author implementing exemplary embodiments may analyze the semantics of both the specific pattern and the DSML and use the analysis to weaken the constraints of the pattern in a way that still leaves the pattern specification 30 inline with the implied pattern's intent. As shown previously, constraints in pQVT can take many forms: a specific value for an attribute, a specific association between metaclasses, a relation composition in a when clause, and/or a Boolean expression specified in OCL. The way to weaken an attribute value constraint is to either remove it and/or replace it with a weaker Boolean expression. For example, the constraint on the lower bound of the anAdaptee role in variant 1610 of FIG. 16B can be removed to allow the other valid value of 0, which is still inline with the Object Adapter 1610 pattern's intent of having an instance of Adaptee to delegate to. An alternative would be to replace it with the OCL expression (lower=0 or lower=1) in the when clause.

Similarly, the way to weaken an association constraint is to either remove it, if unnecessary to begin with, and/or replace it with a transitive version. For example, instead of requiring the Target class to be a direct superclass (an association in the metamodel) of the Adapter class, one can also allow it to be indirect (the Target class is a ancestor of the Adapter class). On way to define a transitive association in MOF is to model it as derived with a recursive derivation expression. The expression would calculate the transitive closure of all elements related to a given element using the association. For example, to specify the transitive closure of super classes of a given class, one can define a new derived allSuperClasses association from metaclass Class to itself with the expression: self.superClass→union(self.superClass.allSuperClasses).

Nevertheless, the above implementation can be utilized, e.g., when the user can change the DSML metamodel to add such a derived association. This may or may not be possible in some cases. For example, this may not feasible when the DSML is defined by a different organization. One way avoid this issue in QVTr is to define the derivation directly in the transformation (pattern specification 30) of the transformation language application 20 using a query that takes a given element as an argument and returns the closure of related elements as a result according to exemplary embodiments. FIG. 21 shows the definition of the query along with how it can be called from a relation 2100 as a constraint by the transformation language application 20 according to exemplary embodiments.

In FIG. 21, one observation is that the query's expression is slightly different than the original one because the query is defined in the context of the transformation, not the context of the metaclass Class. Another observation is that the way to use the query is from when/where clauses and not inside domains as other associations in the metamodel, which makes relations different to read. To address this, we add an enhancement to QVTr to allow it to define associations in a consistent way with the MOF-defined ones according to exemplary embodiments. We the QVT Operational language, which allows the user to define new properties and operations for existing DSML metaclasses that get merged-in in the context of the transformation (only). In our case, we allow new derived properties (including association ends) to be defined in the context of existing DSML metaclasses and used in a similar way to metamodel-defined ones within the transformation. The properties will specify their context metaclass, type, and derivation expression (specified in the context of the metaclass).

FIG. 22 shows an example of how a new derived property allSuperClasses is defined in the context of metaclass Class and then used in the AdapterPattern relation. We also use this property in ClassAdapterPattern to replace the constraint requiring the Adapter class to directly specialize the Adaptee class. We also define a new derived property Class::alloperations (specified in a similar way and thus not shown here) to specify the transitive closure of all operations owned directly or indirectly (inherited) by the class. We then refactor a constraint in AdapterPattern, currently requiring class Adaptee to directly own operation realRequest, by moving it to ClassAdapterPattern only (it is the only constraint for Adaptee in this variant) and use the new transitive property as a constraint in ObjectAdapterPattern. In the latter case, operation realRequest becomes transitively owned by class Adaptee, relaxing the previous constraint it must directly be owned by the type of attribute anAdaptee.

Furthermore, the way to weaken constraints expressed as relation compositions and/or Boolean conditions in when clauses is to remove them or replace them with weaker ones. For example, the variant relations 1605 and 1610 for Adapter in FIG. 16B specify a condition in the when clause that operation request must directly call operation realRequest. The way to relax this condition is to replace it with one that allows for indirect calls, which is may be more practical since UML classes often split logic into several operations that call each other. FIG. 23 in box 2315 shows the new queries localCall and delegationCall that check for both direct and indirect (i.e., after a sequence of local) operation calls. The new queries 2315 replace the old ones in the variant relations 2305 and 2310 in FIG. 23.

3.3.4 Managing Occurrence Type

Up until now we have discussed how to create an accurate pattern specification 30 of a design pattern in which the pattern specification 30 detects (when executed by the transformation language application 20) results that compromise between precision and recall, both of which are affected by the constraints in the pattern specification 30. Another factor that has an impact on those two metrics is the choice of roles to include in a pattern occurrence and/or what is called the occurrence type. In every pattern, there are main roles that characterize it (give the big picture) and others that add details. For example, in the Adapter pattern, the transformation language application 20 finds Target, Adapter, and Adaptee to be the main roles since they are the most useful in helping a user understand an occurrence of Adapter. Other roles, such as request and realRequest, add detail but can then be traced manually by model inspection. However, if the other roles are reported as well by the transformation language application in the output pResults model 24, these other roles may help the user rule out false positives quickly.

On the other hand, reporting non-main roles may decrease precision because they are often the ones with most variability (e.g., behavioral information may not exist in UML models to accurately match roles request and realRequest). In order to deal with this situation, we have added a Boolean flag named is Main to the RoleBinding class of the pResults metamodel (i.e., target DSML) 26 shown in FIG. 10. When this flag is set, it marks those role binding as main by the transformation language application 20. The other roles still get reported but become marked as non-main by the transformation language application 20. Then, when displaying the results (i.e., pattern occurrences in pResults output 26) on the display 45, the transformation language application 20 can use that flag to initially hide non-main role bindings from the pResults model tree (e.g., like tree 910) and give the user the option to show them selectively, which is highly efficient for the user. FIG. 24 shows how we revise the presults domain in the Adapter variant relations to add is Main flags to some role bindings for the pattern specification 30.

FIG. 25 illustrates a method 2500 for detecting pattern occurrences utilizing the transformation language (software) application 20 on the computer 10 according to exemplary embodiments. Although (QVT) transformation language is discussed for example purposes, it is understood that other transformation languages may be utilized according to exemplary embodiments.

At operation 2505, an input model 22 is received by the QVT transformation language application 20 in which the transformation language application 20 is configured to transform the input model 22 in a modeling language to an output model 24 conforming to pResults (DSML) 26 containing pattern occurrences.

At operation 2510, a pattern specification is received by the transformation language application 20 and the pattern specification is configured as a transformation relation 30. For example, the pattern specification (i.e., transformation relation) 30 may be typed in by the user via the user interface 50 (such as a keyboard). Also, the user may select a pattern specification 30 from a pattern specification database 70 to be input.

At operation 2515, the transformation language application 20 is executed by utilizing the pattern specification 30 to detect the pattern occurrences 30 in the input model 22.

At operation 2520, the transformation language application 20 outputs/reports pattern occurrences in the output model (pResults) 24, where the pattern occurrences are instances of the pattern specification in the input model.

Further, the pattern specification 30 is executed as the relation for a transformation. The output model 24 is designed to receive the pattern occurrences as instances of detecting the pattern in the source input model 22. The pattern specification 30 defines a pattern using a syntax for the transformation relation. The pattern specification 30 defines a pattern (as shown in FIG. 11) in terms of a checkonly clause in the relation and an enforce clause in the relation.

The pattern specification 30 defines how classes of the source input model 22 play roles in a pattern and how the classes map to the pattern occurrences. The pattern specification 30 defines that the pattern occurrences are to be represented in the output model 24. The pattern specification 30 defines a pattern as the relation by utilizing a where clause and when clause of the relation to add constraints.

The computer 10 has the capabilities to implement exemplary embodiments discussed herein. Various methods, procedures, approaches, modules, flow diagrams, tools, application, and techniques discussed herein are implemented in and/or utilize the capabilities of the computer 10.

Although there are conventional approaches, the conventional approaches may have various issues associated with them. The technical benefits of exemplary embodiments allow patterns to still be specified in predicate logic (using OCL) directly on MOF-based metamodels and detected directly in (input) models conforming to that metamodel. Patterns specifications in pQVT can have any number of constraints, allow efficient navigation of the models according to those constraints and do not require a big memory footprint. Unlike conventional approaches, exemplary embodiments (sometimes refereed to herein as pQVT), define patterns at the metamodel level, while conventional approaches define patterns at the model (instance) level and thus are mainly applicable to a specific language (UML in this case). Also, pQVT is not required to define separate detection semantics as it uses the execution semantics of QVTr generically for detecting pattern specified for any DSML. In exemplary embodiments, pQVT uses the full expressive power of OCL/QVTr and is able to express local variables in relations to relate the pattern roles together, unlike conventional approaches that provide a very limited expression language (the navigation syntax of OCL only) and mandating inter-relationships between roles to be specified with separate nested relations, making the specification very verbose.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the exemplary embodiments of the invention have been described, it will be understood that those skilled in the art, both now and in the future, may make various improvements and enhancements which fall within the scope of the claims which follow. These claims should be construed to maintain the proper protection for the invention first described.

What is claimed is:

1. A method for detecting pattern occurrences utilizing a transformation software application, as a query-view-transformation (QVT) tool, on a computer, comprising:
    receiving an input model conforming to a modeling language in which model elements playing pattern roles are detected as patterns by utilizing transformation logic of the transformation software application and a pattern specification configured as a transformation relation;
    producing an output model that concisely reports pattern occurrences of the patterns; and
    outputting the pattern occurrences in the output model, wherein the pattern occurrences are instances of detecting the patterns in the input model;
    wherein a results metamodel is a structure for the output model; and
    wherein the output model is designed to receive the pattern occurrences as instances of detecting the patterns in the input model without the computer transforming the input model into the output model.

2. The method of claim 1, wherein the pattern specification is executed as the transformation relation for a transformation.

3. The method of claim 1, wherein the pattern specification defines a pattern using a syntax for the transformation relation.

4. The method of claim 1, wherein the pattern specification defines a pattern in terms of a checkonly clause representing the pattern roles in the input model in the transformation relation and in terms of an enforce clause representing the pattern occurrences in the transformation relation.

5. The method of claim 1, wherein the pattern specification defines how classes of the source input model play roles in a pattern and how the classes map to the pattern occurrences; and
    wherein the pattern specification defines that the pattern occurrences are to be represented in the output model.

6. A computer, comprising:
    a processor configured to execute computer instructions; and
    memory comprising: a transformation software application, as a query-view-transformation (QVT) tool, configured for receiving an input model conforming to a modeling language in which model elements playing pattern roles are detected, and producing an output model that concisely reports occurrences of those patterns by utilizing transformation logic of the transformation software application and a pattern specification configured as a transformation relation;

the processor is configured to execute the transformation software application by utilizing the pattern specification to detect pattern occurrences in the input model; and the processor is configured to report the pattern occurrences in the output model, wherein the pattern occurrences are instances of detecting patterns in the input model;

wherein a results metamodel is a structure for the output model; and wherein the output model is designed to receive the pattern occurrences as instances of detecting the patterns in the input model without the computer transforming the input model into the output model.

7. The method of claim 6, wherein the pattern specification defines a pattern as the transformation relation by utilizing a where clause and when clause of the relation to add constraints and to decompose the pattern specification.

8. The computer of claim 6, wherein the processor is configured to execute the pattern specification as the transformation relation for a transformation.

9. The computer of claim 6, wherein the pattern specification defines a pattern using a syntax for a relational transformation language.

10. The computer of claim 6, wherein the pattern specification defines a pattern in terms of a checkonly clause representing the pattern roles in the input model in the transformation relation and in terms of an enforce clause representing the pattern occurrences in the transformation relation.

11. The computer of claim 6, wherein the pattern specification defines how classes of the input model play roles in a pattern and how the classes map to the pattern occurrences; and wherein the pattern specification defines that the pattern occurrences are to be represented in the output model using relation language.

12. The computer of claim 6, wherein the pattern specification defines a pattern as the transformation relation by utilizing a where clause and when clause of the transformation relation to add more constraints and to decompose the pattern specification.

13. The computer of claim 6, wherein the processor is configured to display the pattern occurrences in a tree.

14. The computer of claim 6, wherein the pattern specification is configured to be input and displayed in textual form and in graphical notation as the relation.

15. A computer program product for detecting pattern occurrences utilizing a transformation software application, as a query-view-transformation (QVT) tool, on a computer, the computer program product comprising:

a computer readable storage memory having computer readable program code embodied therewith, the computer readable program code for detecting pattern occurrences comprising:

receiving an input model conforming to a modeling language in which model elements playing pattern roles are detected as patterns by utilizing transformation logic of the transformation software application and a pattern specification configured as a transformation relation;

producing an output model that concisely reports pattern occurrences of the patterns; and outputting the pattern occurrences in the output model, wherein the pattern occurrences are instances of detecting the patterns in the input model;

wherein a results metamodel is a structure for the output model; and wherein the output model is designed to receive the pattern occurrences as instances of detecting the patterns in the input model without the computer transforming the input model into the output model.

16. The product of claim 15, wherein the pattern specification is executed as the transformation relation for a transformation.

* * * * *